US006574780B2

(12) United States Patent
Le Coz

(10) Patent No.: US 6,574,780 B2
(45) **Date of Patent: *Jun. 3, 2003**

(54) METHOD AND SYSTEM FOR ELECTRONICALLY MODELING AND ESTIMATING CHARACTERISTICS OF A MULTI-LAYER INTEGRATED CIRCUIT CHIP CARRIER

(75) Inventor: Christian Robert Le Coz, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 17 days.

This patent is subject to a terminal disclaimer.

(21) Appl. No.: 09/845,395

(22) Filed: Apr. 30, 2001

(65) Prior Publication Data

US 2001/0039644 A1 Nov. 8, 2001

Related U.S. Application Data

(63) Continuation-in-part of application No. 09/429,990, filed on Oct. 29, 1999.

(51) Int. Cl.[7] .................................................. G06F 17/50

(52) U.S. Cl. ................................... 716/4; 716/5; 716/8

(58) Field of Search ................................ 716/4, 5, 7, 8, 716/9, 11, 13, 14; 703/14

(56) References Cited

U.S. PATENT DOCUMENTS

| | | | |
|---|---|---|---|
| 4,910,680 A | | 3/1990 | Hiwatashi |
| 4,964,057 A | | 10/1990 | Yabe |
| 4,965,739 A | | 10/1990 | Ng |
| 5,124,273 A | | 6/1992 | Minami |
| 5,187,671 A | | 2/1993 | Cobb |
| 5,315,534 A | | 5/1994 | Schlachet |
| 5,404,310 A | | 4/1995 | Mitsuhashi |
| 5,539,652 A | | 7/1996 | Tegethoff |
| 5,546,321 A | | 8/1996 | Chang et al. |
| 5,644,500 A | | 7/1997 | Miura et al. |
| 5,691,913 A | | 11/1997 | Tsuchida et al. |
| 5,790,414 A | | 8/1998 | Okano et al. |
| 5,812,417 A | | 9/1998 | Young |
| 5,910,897 A | * | 6/1999 | Dangelo et al. ............ 364/488 |
| 5,930,499 A | | 7/1999 | Chen et al. |
| 6,253,356 B1 | * | 6/2001 | Kung ........................... 716/5 |
| 6,253,363 B1 | * | 6/2001 | Gasanov et al. .............. 716/12 |

FOREIGN PATENT DOCUMENTS

JP 1009237 A2 4/1998

* cited by examiner

*Primary Examiner*—Tom Thomas
*Assistant Examiner*—Douglas W. Owens
(74) *Attorney, Agent, or Firm*—Scully, Scott, Murphy & Presser; Lawrence R. Fraley, Esq.

(57) ABSTRACT

For a mulitlayer chip carrier module a computer program receives a large plurality of module design parameters and provides as output a graphical representation of the design together with text files that rate module wireability, including die pad position, attachment of each die pad to its BGA pad, and net cross-over; and quantifies the number of redistribution layers; summarizes input parameters; creates a truth table for rating wireability and thermal requirements; and provides cost sensitive parameters.

29 Claims, 18 Drawing Sheets

OUTPUT DISPLAY

134

CHIP SETTINGS
Chip size: 7x7 mm
Chip Pitch: 60 microns
Closest Pitch Pads: Any Orthogonal Adjacent
Chip Pad: 70 microns Square
Chip Thickness: 500 microns
Chip ID: 436
Power/Ground ratio: 24.54%

LAMINATE SETTINGS
Technology: w/b
Style: cavity
Layup: 2S0P
Size: 23mm
Matrix 27x27
Outer Rows: 4
BGA I/O: 368
% Ground/Voltage BGA: 10.60%
Jedec Ball Matrix Tight: no
BGA Pitch: 0.8 mm
BGA Pad: 425 microns
BGA Procoat: 475 microns
Line Width: 26.2 microns
Thermal Balls: 0
Number of Rings: 1
Ground Ring Width: 400 microns
Voltage Ring Width: 400 microns
Ring-Ring Space: 200 microns
Die to Ring or Cavity Space: 500 microns
Chamfer Leg: 1.5 mm
Drill: 200 microns
Via Pad Size (Front): 400 microns
Via Pad Size (Back): 450 microns
Dogbone Width: 200 microns
Dogbone Length: 435 microns
Outside Voltage Divider: 500 microns

FIG. 2C

METHOD AND SYSTEM FOR ELECTRONICALLY MODELING AND ESTIMATING CHARACTERISTICS OF A MULTI-LAYER INTEGRATED CIRCUIT CHIP CARRIER

CROSS-REFERENCE TO RELATED PATENT APPLICATION

This application is a continuation-in-part application of Ser. No. 09/429,990, filed on Oct. 29, 1999.

BACKGROUND OF THE INVENTION

1. Field of the Invention

The invention pertains to the modeling and estimating of substrate characteristics in preferably multi-layer chip carrier designs. More particularly, the invention is directed to physical modeling of electronic modules, including the interconnection of chip and chip carriers, such as the count calculation of chip carrier layers in order to optimize chip carrier designs by employing surface laminar circuitry (SLC) or buildup technology; and quantifies the number of redistribution layers of the chip carriers.

2. Discussion of the Prior Art

In essence, several methods are available in the technology for modeling chip and chip carrier interconnection layouts.

One approach is to review a data base of all previously designed modules, and select the one with matching fundamental parameters, such as die size, carrier size, and the number of chip inputs/outputs. However, a problem existent with this approach resides in the difficulty of identifying and dealing with all of the above-mentioned parameters which are required to attain the intended goals. Another approach is to build the design from the start; this being a time consuming process that often results in the necessity for discarding the design as the parameters change due to new requirements and/or design objectives.

A further approach would be to initially prepare a layout or sketch of the die showing the die pad positions required by a customer and then to laminate manually. The problem with this approach again resides in the level of skill and experience required in effecting the foregoing, and the difficulty in identifying and dealing with all of the parameters required, and the difficulty in visually expressing and modifying the design as may be necessary in order to meet all conditions.

There is, consequently, a need in the technology for a method and system providing for a quick and visual representation of a complicated module design which takes into account all relevant parameters. This is needed for early modeling of a more complex process and essentially useful for the early design and quick modeling of chip carriers, such as plastic ball grid array (PBGA), flip chip, or wirebond chip carriers.

As disclosed in the parent application, Ser. No. 09/429,990, an object is to provide an improved system and method for simulating and graphically assessing the cost and feasibility of general and specific wiring design cases. Another purpose is to provide a system and method for simulating general and specific wiring design cases and quickly assess the simulated design graphically. Moreover, provision is made for a system and method for assessing a simulated wiring design with respect to crossing, choking, signal runs, wiring channels and input/output; and for transmitting simulated design graphical data to a wiring design tool.

In accordance with the foregoing, pursuant to the disclosure of the parent application, a system and method is provided for modeling and estimating substrate characteristics preliminary to preparing a detailed design. Input parameters include die size and substrate size and, optionally, a netlist of interconnections between the die and substrate. Responsive to these input parameters, a representation of an optimized estimated fanout of the interconnections is graphically presented together with a set of substrate parameters derived from the optimized estimated fanout. In that connection, a computer program product is configured to be operable to graphically model an optimized fanout of die to substrate interconnections.

SUMMARY OF THE INVENTION

In essence, as a further improvement over the parent application, which relates to a chip carrier design simulation, estimator, and an early design for providing a system for quickly modeling and estimating substrate characteristic including optimized single layer fanout, substrate parameters such as size, wiring rules and I/O layout, the present invention provides a tool which is a system or method for electrically estimating multilayer substrates for various chip carrier designs as set forth herein.

Basically, the problem which is solved by the present invention with regard to a chip carrier layer count calculation resides in that an accurate and fast estimate for various customer die designs is provided in that the customer provides a die showing die pad position, and a further request as to the physical size of the package, the package I/O, the design rules, the number of layers and ultimately the cost.

For that purpose, the inventive concept is grounded in providing a subroutine as part of the overall program generally referred to as buildup technology or SLC (surface laminar circuitry). Thus, given the specified input parameters, the invention provides a program determinative of the number of signal distribution layers required to access module I/O bumps (BGA's).

BRIEF DESCRIPTION OF THE DRAWINGS

Other features and advantages of this invention will become apparent from the following detailed description of the preferred embodiment of the invention, taken in conjunction with the accompanying drawings; in which.

DETAILED DESCRIPTION OF PREFERRED EMBODIMENTS

As detailed hereinbelow with reference to FIGS. 1 through 11C, the description is a reiteration of the method and system described and claimed in parent patent application Ser. No. 09/429,990.

Figure 1:
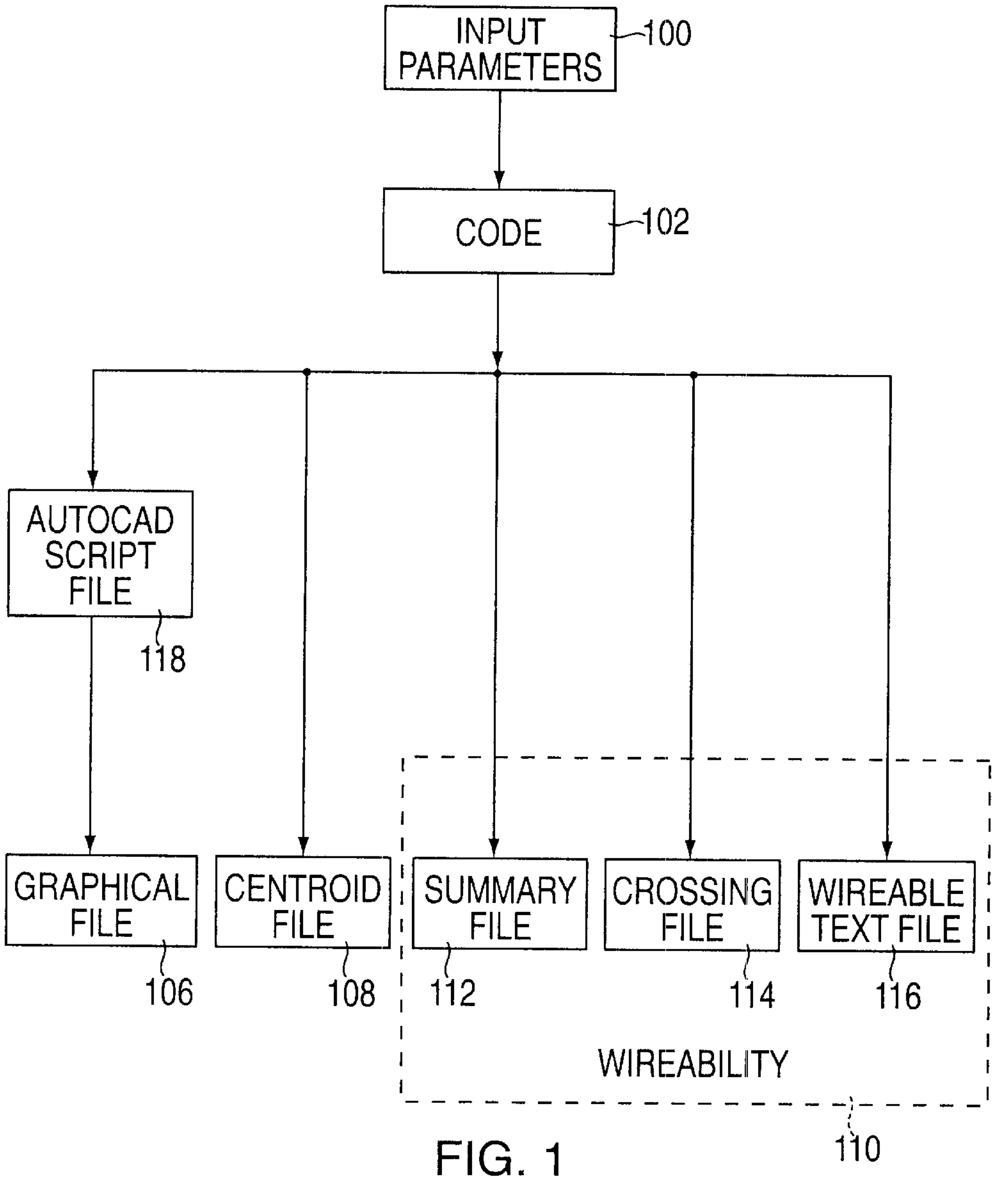
FIG. 1 is a high level flow diagram of the method in accordance with the parent application for early design and modeling of an electronic module.

Referring to FIG. 1, input parameters 100 are received and input to code module 102 running in a main frame or PC using REXX language and/or WINDOWS type interfaces. The output of code module 102 includes script file 118 and graphical file 106, centroid file 108, and wireability files 110, including summary file 112, crossing file 114, wireable text file 116, and (SLC) or buildup layer count file, as described hereinbelow in specific detail.

Figure 2:
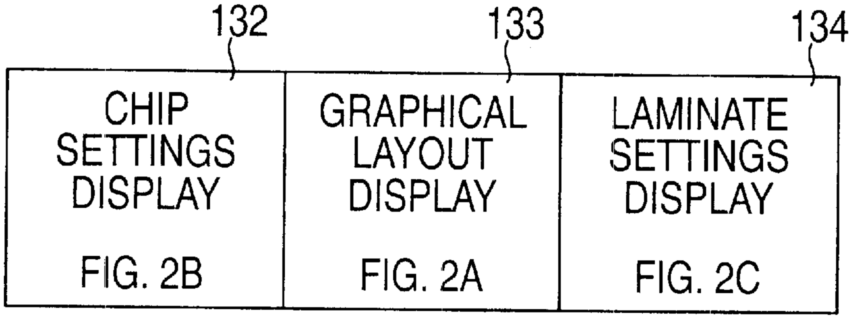
FIGS. 2A–2C, arranged as shown in FIG. 2, represent an output display in accordance with the method of FIG. 1.

Graphical file 106 includes and when printed or displayed provides, as is illustrated in FIG. 2, an annotated graphical drawing of the module design, including graphical layout display 133 showing the point to point connections between die or chip pads 120 to ball grid array (BGA) pads 122. The annotations include alpha numeric pad row and column identifiers 124, 126, BGA pad designations 128, chip pad designations 130, chip input parameters 132, and chip carrier, substrate or parameters 134. These are shown enlarged in FIGS. 3 and 4.

Centroid file 108 includes die pad number, chip pad name, X-Y position of chip pad center, quadrant, BGA alphanumeric designation (when applicable), X-Y position of BGA pad center, and chip pad to BGA pad line slope. (An example of centroid file 108 is shown in Table 2.) The slope column indicates the slope of the line described by the direct line from chip pad to BGA pad, and is tracked for closest slope routing. Also, in the north and south quadrants the slope is defined as x/y whereas in the east and west quadrants it is the traditional y/x. This is done inasmuch as direct north y/x explodes into the undefined value 1/0. The crossing column indicates how many lines cross a particular line.

Figure 7:
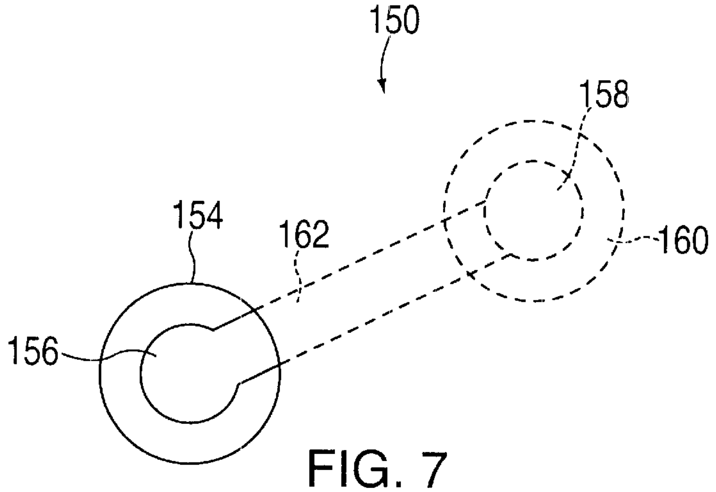
FIGS. 7 and 8 are two views of a ball grid array (BGA) connection system.
Figure 8:
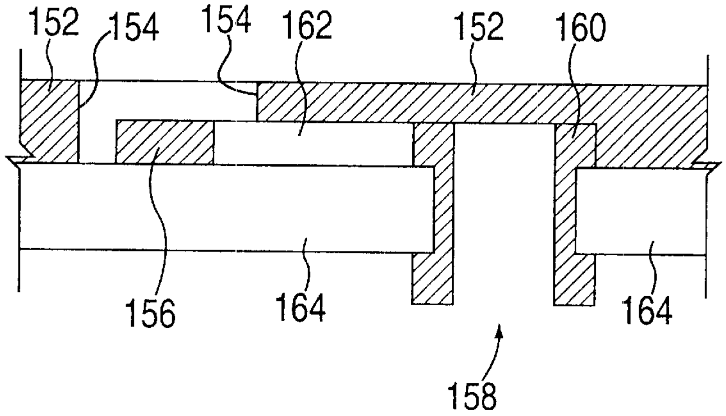
Figure 9:
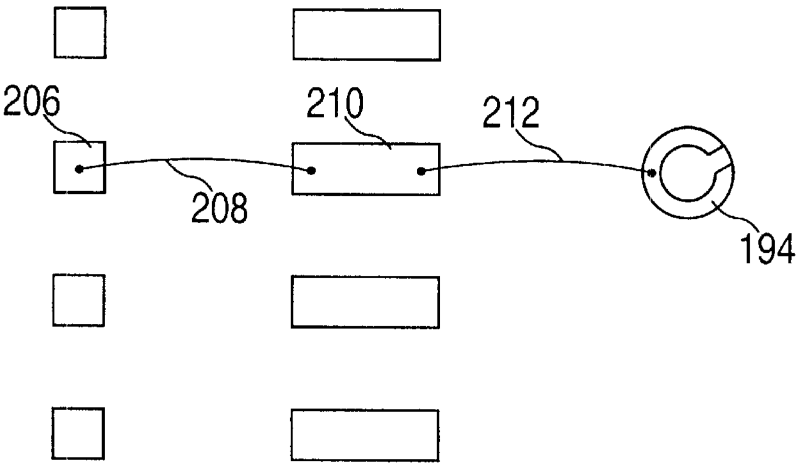
FIG. 9 illustrates a wire bond attachment system.
Figure 10:
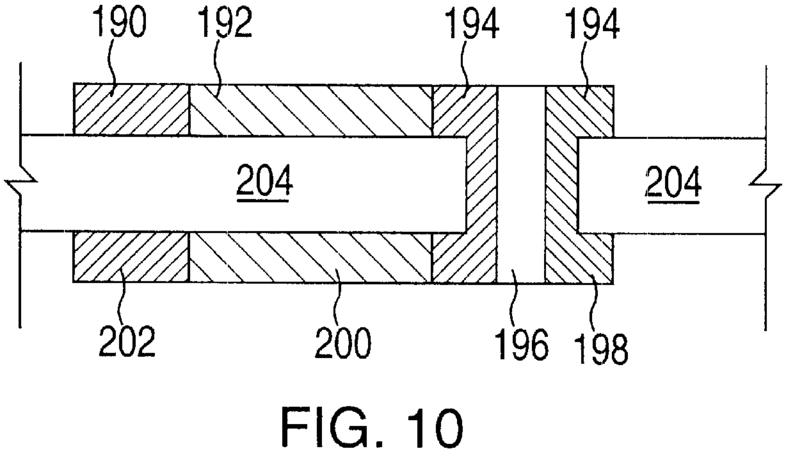
FIG. 10 illustrates a flip chip attachment system.

FIGS. 9 and 10 illustrate the interconnect configuration for flip chip, and FIGS. 7 and 8 illustrate the interconnect configuration for wire bond. Flip chip interconnection includes chip attach pad 190, wire 192, top via land 194, via 196, bottom via land 198, dogbone 200, and bga pad 202, on substrate 204.

FIG. 8 illustrates a wiring configuration with wire bond fingers. Interconnection is from die pad 206, to wirebond 208, to wire bond finger 210, to wire 212, to top via land 194.

Figure 11A:
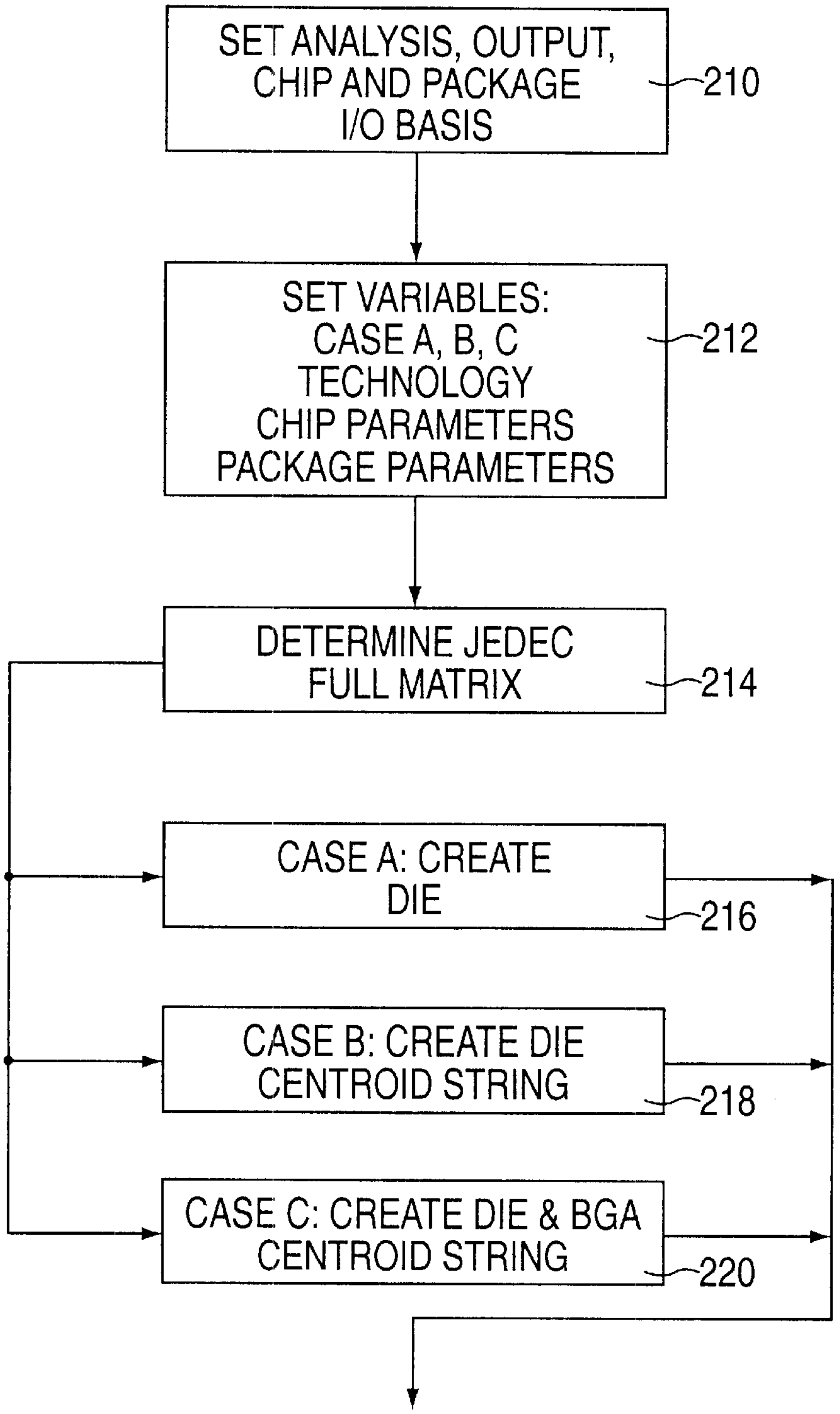
FIGS. 11A–11C, arranged as shown in FIG. 11, are a flow diagram of the method steps of the invention.
Figure 11B:
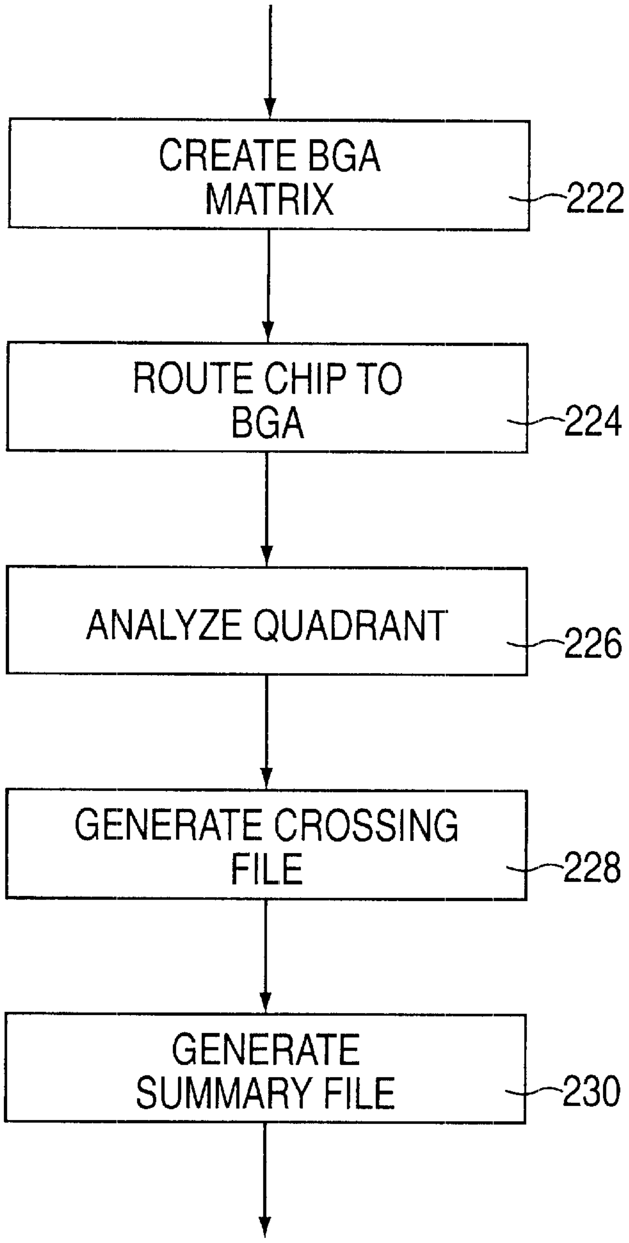
Figure 11:
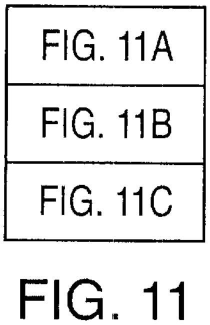
Figure 11C:
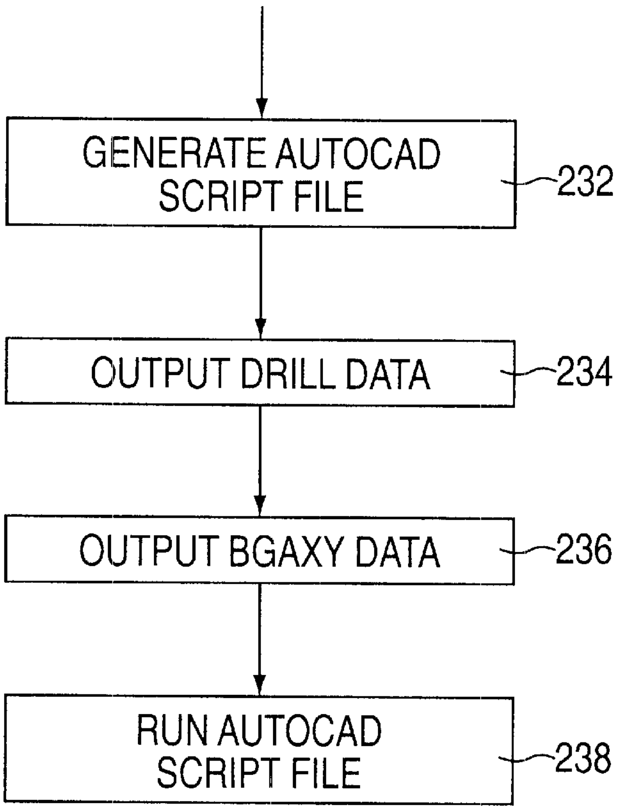
Figure 12A:
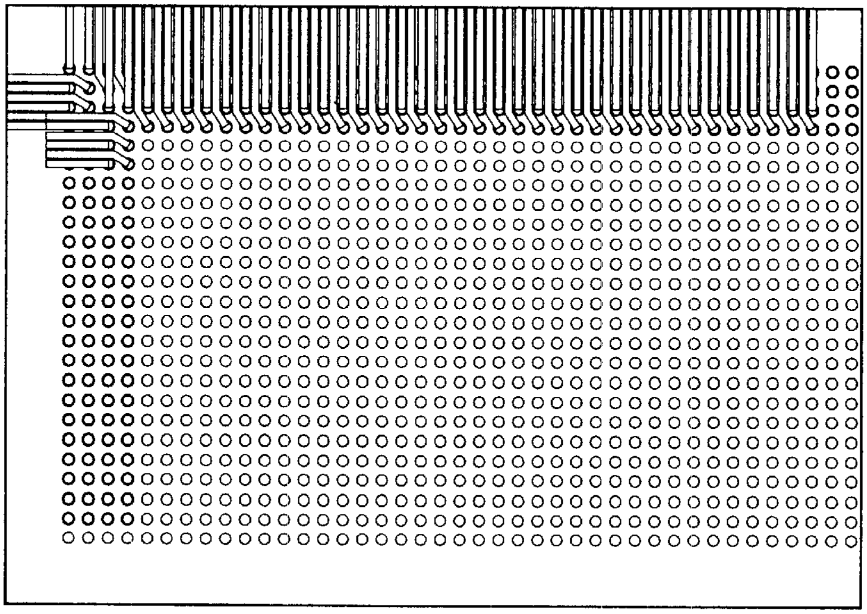
FIGS. 12A–12D illustrate, respectively, output wiring displays in accordance with the inventive method.
Figure 12B:
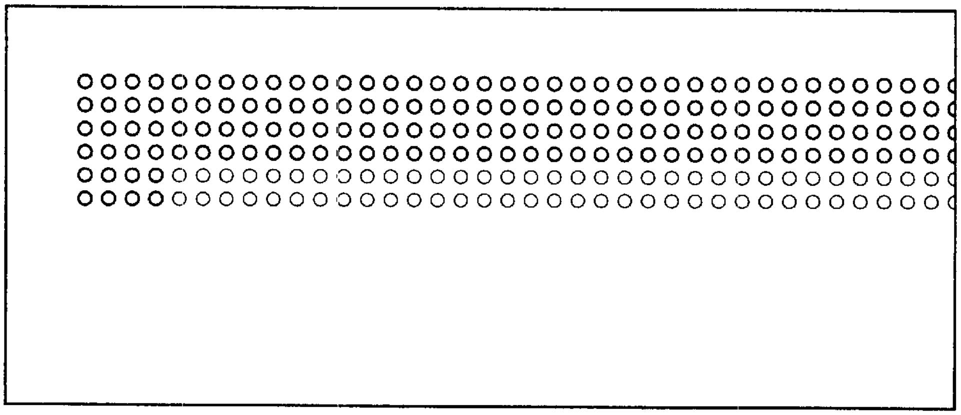
Figure 12C:
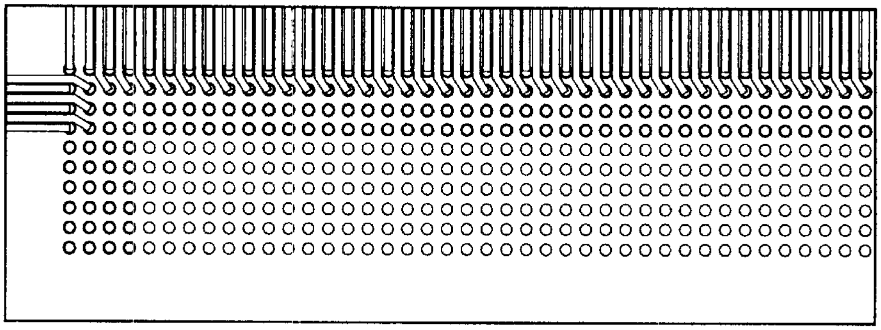
Figure 12D:
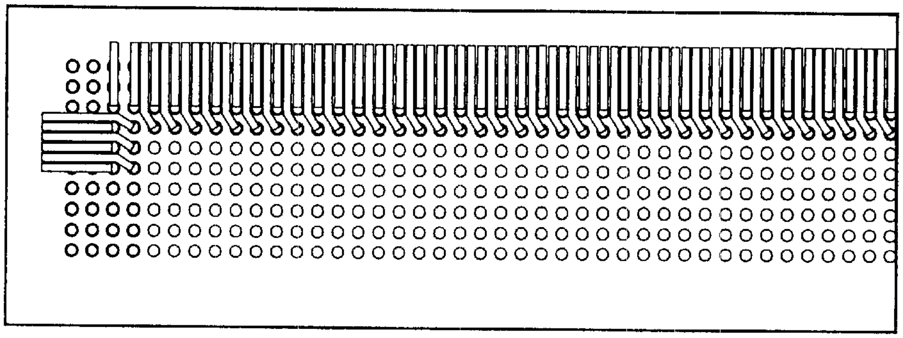

Referring to FIG. 11 in connection with Table 1, the processes executed by code 102 are set forth pseudo code.

TABLE 1

```
CODE

STEP 210: Set Analyses/Output/Chip and Package IO Basis
    Graphical Script
        Physical
        Mechanical
    Text Files
        BGAXY
        Drill Data
        RFS
        Quadrant Analysis
        Quadrant Crossing
        SLC Layer Count (described hereinbelow)
```

TABLE 1-continued

```
CODE

        Specify # IO or Pitch
        Chip
        Package
STEP 212: Set Variables
    Case A,B,C
        Case 'A' = Random Die, Random Netlist
        Case 'B' = Specified Die, Random Netlist
        Case 'C' = Specified Die, Specified Netlist
    Set Technology
        Flip Chip
        Wirebond Laminate Technology = SLC or STD
    Define Chip Parameters
    Define Package Parameters
        Circuitization rules
        Package General Parameters
        Package Thermals
STEP 214: Jedec Full Matrix Determination given Package
Size/EGA pitch/Tight or Loose
    Find Matrix Polarity
    Quadrant Dividing Slope
    Depopulation Determination
    Per Module IO Set or Outer Row Set
    Define Alphas for Row Number
STEP 216: Create Die (Case A)
    Flip Chip
        Define Matrix Per IO or Chip Pitch
        Determine Polarity of Matrix
        Construct the Die Centroid String (#, X,Y,
        Quadrant)
        Assign Ground/Voltage and Signals Randomly per
        Set PCT (#, Name, X, Y, Quadrant)
        Calculate Composition Ratios (Signals and G/V's),
        #Signals, #Grounds, #Vlt per side
    Wirebond
        Define Pads per Side or Chip Pitch
        Construct the Die Centroid String (#, X,Y,
        Quadrant)
        Assign Ground/Voltage and Signals Randomly per
        Set PCT (#,Name, X, Y, Quadrant)
        Calculate Composition Ratios (Signals and G/V's),
        #Signals, #Grounds, #Voltages side
STEP 218: Create Centroid String for Die (Case B)
    Input Die Centroid Data
    Assign a Quadrant
    Sort in Sequential Order/CCW Feed
    Determine Minimum Chip Pitch and Kerf
    Calculate Composition Ratios (Signals and G/V's),
    #Signals, #Grounds, #Voltages on perside
STEP 220: Create Centroid String for Die and BGA (Case C)
    Input Die and Netlist
        Assign a Quadrant
        Calculate Composition Ratios (Signals and G/V's),
        #Signals, #Grounds, #Voltages on perside
STEP 222: Create BGA Matrix
    Find X,Y, Slope, Side (Assign Border BGA's to
    Quadrants Evenly)
    Determine Alphanumeric per Matrix and Cavity/Dieup
    Centroid BGA Dataset (X,Y, Slope from 0,0, Side,
    Alphanumeric)
    Punch Out Depops
    Separate into separate matrices by Quadrant
    Assign Type (Ground, Voltage, and Signals) for each
BGA
STEP 224: Chip to EGA Routing
    Case A and Case B Routing
        Separate Chip Centroid into matrices by Quadrant
        Closest Slope Search Routine
        Output String (#, Name, Chipx, Chipy, Side,
        Alphanumeric, BGAx, BGAy, Slope)
    Case C Routing
        Calculate Row, Column Position from Alphanumeric
        Add Slope to String
STEP 226: Quadrant Analysis Routine
    Calculate Runs
    Calculate Power Levels and Quadrant Location
    Calculate Number of WB Fingers Needed
    Print to a File
```

TABLE 1-continued

CODE

- STEP 229: Buildup or SLC Layer Count Analysis (described hereinbelow)
- STEP 228: Crossing Factor Analysis
  - Take each Routing and count the number of times it is crossed by another line within Quadrant
  - Use Cramer's Rule to solve two equation/two unknowns.
  - Append Centroid String to include Crossing Count
  - Rank in Descending Order
  - Print to a File
- STEP 230: Summary (RFS) Analysis
  - Calculate Line Width/Space for 1 thru 8 LPC on BGA side
  - Calculate Line Width/Space for 1 thru 8 LPC on Die Up Side
  - Match Wiring Rules to above
  - Calculate Distance Left for Fingers plus Fanout for Dieup and Cavity
  - Calculate Choke Factor which is fanout space/Wiring Pitch(12)
  - Gold Area Calculation (10)
    - Set Goldcost, Nickel Cost, and thickness
    - Ground Ring Area + Voltage Ring Area + Finger Area
    - Full Gold Via Area on Cavity (Lands + Inner Walls); estimate Via Count
    - Flower Pad Calculation
    - Selective Gold Via Area on Die UP (Lands + Inner Walls); estimate Via Count
    - BGA Area
    - Stiffener Area
    - Cavity Wall
    - Wiring Area Front and Back
    - Gold Runner
  - Summation of Total Gold for Die Up
  - Summation of Total Gold for Cavity
  - Complexity Factor
    - Die Area/Signal Count . . . Die Escape Factor
    - Die Area/ChipIO . . . Chip Density Factor
    - Laminate Area/Signal Count . . . BGA Escape Factor
  - Flatness Calculation
    - Drill Count Calculation
  - Print All to Summary File plus Key Input Parameters
- STEP 232: Autocad Scrip Generation
  - Construct All Layers
  - Define Laminate Coordinates for Top View and Side View
  - Define Die Coordinates for Top View and Side View
  - Draw Chamfer
  - If Mechanical Document Package
    - Side View of Laminate
    - Side View of Die
    - Top View of Lid
    - Side View of BGA Ball
    - Side View of C4 Balls
    - Spacing between Plan View and Side View
    - Draw Side View and Move it over
    - Draw Top View of Lid
  - If Physical
    - Draw Multi Vertice RATS(13)
    - Draw BGA, Procoat, Middle of Bone and Holes (Print Holes to File too)
    - Set on a 45 Degree Angle According to Octant
    - Draw Flower Pad Construction Circles
    - Draw Voltage and Ground Plane Outlines
    - Draw Ground Ring and Voltage Ring(s)
  - Draw Chip Pads and Chip Text
  - Draw BGA Alphanumerics on 4 sides
  - Draw Aphanumerics on BGA Balls Themselves.
  - Print Out Chip Parameters to the Left of Drawing and Substrate Parameters to rt.
  - Print to an Autocad File
- STEP 234: Print out Drill Data
- STEP 326: Print out BGAXY Data
- STEP 238: Run Autocad Script File from Autocad.

Referring to Tables 2 and 3, a "rat" is a colloquial term meaning an unedited straight line that emanates from the center of a die pad to a ball grid array (BGA) pad, or analogous connections on a mother board. It is then manipulated by moving within a layer and/or placing part of the path on other layers of the package. In the examples of Tables 2 and 3, the centroid data of a die has been created and routed out to the center of a BGA pad, either by a customer definition (case C) or by creation within the program (case A).

TABLE 2

CENTROID FILE

| No. | ID | CHIPX | CHIPY | SIDE | ALPHA | BGAX | BGAY |
|---|---|---|---|---|---|---|---|
| 1 | VSS | 4890 | −4688 | East | | | |
| 2 | Signal | 4890 | −4563 | East P8 | 4445 | −3175 | |
| 3 | VDD | 4890 | −4438 | East | | | |
| 4 | Signal | 4890 | −4313 | East V3 | 9525 | −9525 | |
| 5 | VDD | 4890 | −4188 | East | | | |
| 6 | Signal | 4890 | −4068 | East Y1 | 12065 | −12065 | |
| 7 | Signal | 4890 | −3938 | East | W3 | 10795 | −9525 |
| 8 | Signal | 4890 | −3813 | East | U5 | 8255 | −6985 |

In Tables 2 and 3, the numbering (No.) convention is counterclockwise. Identifier (ID) represents the name assigned. Typically, but not in the examples of Tables 1 and 2, signals are given unique names, such as Signal1, Signal2, etc.

CHIPX is the X dimension to the center of die with reference to the center of the package (0,0). CHIPY is the Y dimension to the center of die with reference to the center of the package (0,0). SIDE is the quadrant (north, south, east or west) to which the die belongs. ALPHA is the alphanumeric position of the ball grid array (BGA) pad as defined by the Jedec Standard. BGAX is the X dimension to the center of the BGA pad with reference to the center of the package (0,0). BGAY is the Y dimension to the center of the BGA pad with reference to the center of the package (0,0).

Figure 2A:
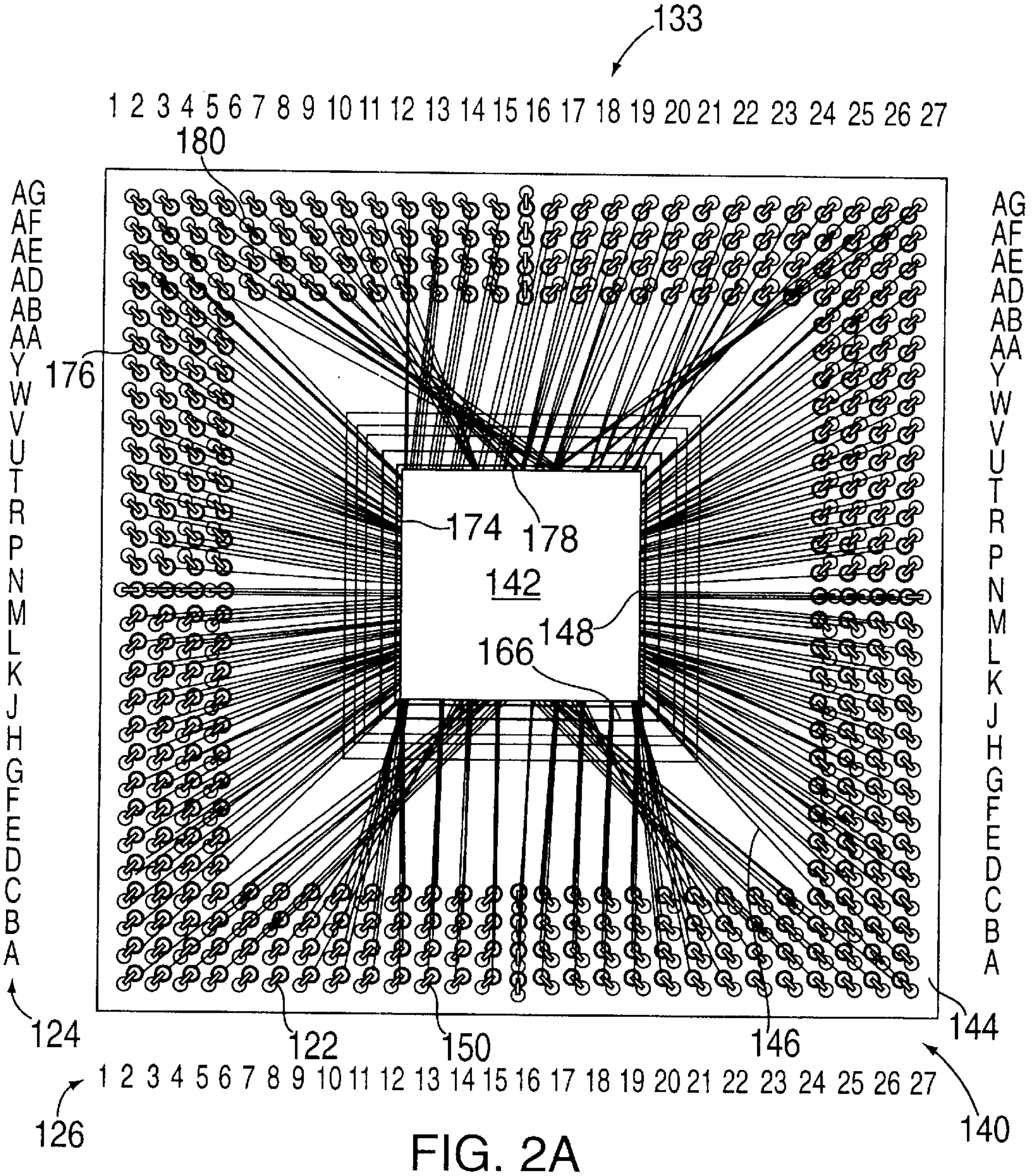
Figure 3:
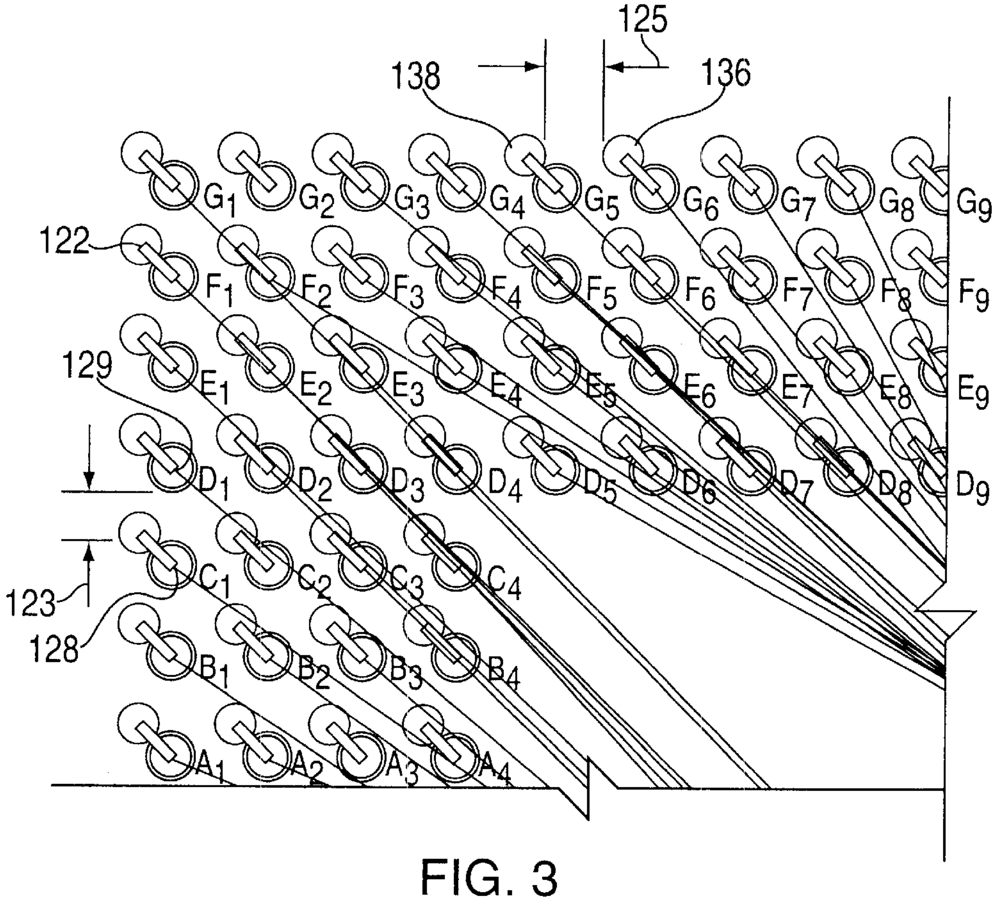
FIG. 3 is an enlarged view of the upper right corner of the display of FIG. 2B.
Figure 4:
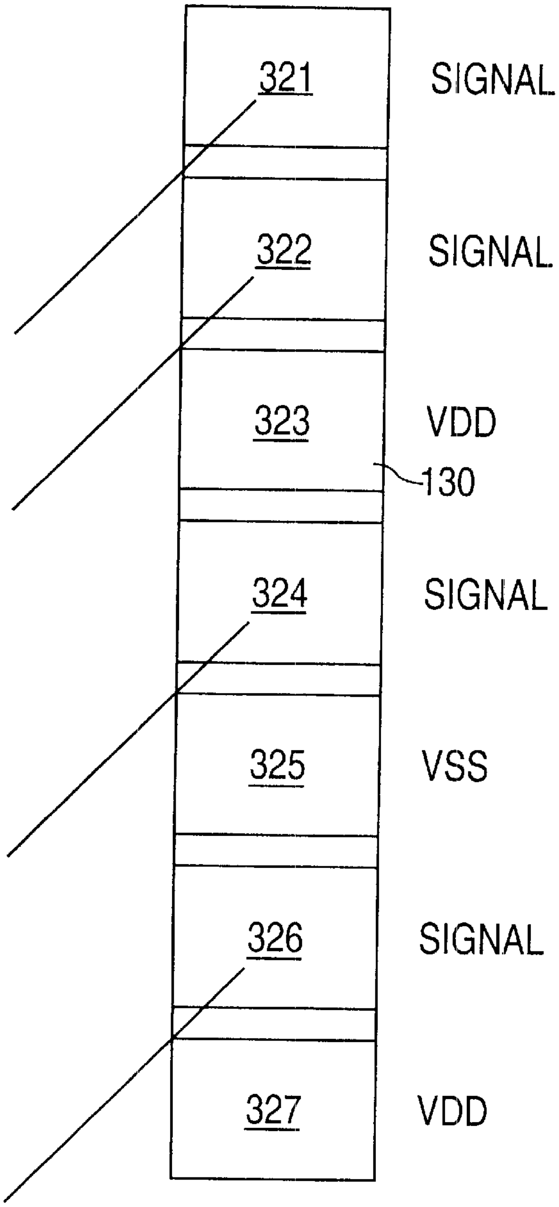
FIG. 4 is, in mirror image, an enlarged view of chip pads shown in FIG. 2B.

Table 3 is the centroid file 108 for the example illustrated in FIG. 2A.

TABLE 3

CENTROID FILE

| # | ID | CHIPX | CHIPY | SIDE | ALPHA | BGAX | BGAY | SLOPE | CROSS |
|---|---|---|---|---|---|---|---|---|---|
| 1 | Signal | 3890 | −3688 | East | E22 | 10795 | −10795 | −1.029 | 0 |
| 2 | Signal | 3890 | −3563 | East | C24 | 13335 | −13335 | −1.035 | 0 |
| 3 | Signal | 3890 | −3438 | East | A26 | 15875 | −15875 | −1.038 | 0 |

TABLE 3-continued

CENTROID FILE

| # | ID | CHIPX | CHIPY | SIDE | ALPHA | BGAX | BGAY | SLOPE | CROSS |
|---|---|---|---|---|---|---|---|---|---|
| 4 | Signal | 3890 | −3313 | East | B26 | 15875 | −14605 | −0.942 | 0 |
| 5 | Signal | 3890 | −3188 | East | D24 | 13335 | −12065 | −0.940 | 0 |
| 6 | Signal | 3890 | −3063 | East | F22 | 10795 | −9525 | −0.936 | 0 |
| 7 | VDD | 3890 | −2938 | East | | | | | |
| 8 | Signal | 3890 | −2813 | East | E24 | 13335 | −10795 | −0.845 | 0 |
| 9 | Signal | 3890 | −2688 | East | F23 | 12065 | −9525 | −0.836 | 0 |
| 10 | Signal | 3890 | −2563 | East | E25 | 14605 | −10795 | −0.768 | 0 |
| 11 | Signal | 3890 | −2438 | East | H22 | 10795 | −6985 | −0.659 | 0 |
| 12 | Signal | 3890 | −2313 | East | F26 | 15875 | −9525 | −0.602 | 0 |
| 13 | Signal | 3890 | −2188 | East | G26 | 15875 | −8255 | −0.506 | 0 |
| 14 | Signal | 3890 | −2063 | East | H25 | 14605 | −6985 | −0.459 | 0 |
| 15 | VSS | 3890 | −1938 | East | | | | | |
| 16 | VSS | 3890 | −1813 | East | | | | | |
| 17 | Signal | 3890 | −1688 | East | J23 | 12065 | −5715 | −0.493 | 0 |
| 18 | Signal | 3890 | −1563 | East | H26 | 15875 | −6985 | −0.452 | 0 |
| 19 | Signal | 3890 | −1438 | East | J26 | 15875 | −5715 | 0.357 | 0 |
| 20 | Signal | 3890 | −1313 | East | K25 | 14605 | −4445 | −0.292 | 0 |
| 21 | Signal | 3890 | −1188 | East | L22 | 10795 | −3175 | −0.288 | 0 |
| 22 | Signal | 3890 | −1063 | East | L25 | 14605 | −3175 | −0.197 | 0 |
| 23 | Signal | 3890 | −938 | East | M24 | 13335 | −1905 | −0.102 | 0 |
| 24 | Signal | 3890 | −813 | East | N24 | 13335 | −635 | 0.019 | 0 |
| 25 | Signal | 3890 | −688 | East | N23 | 12065 | −635 | 0.006 | 0 |
| 26 | VSS | 3890 | −563 | East | | | | | |
| 27 | Signal | 3890 | −438 | East | P24 | 13335 | 635 | 0.114 | 0 |
| 28 | Signal | 3890 | −313 | East | P23 | 12065 | 635 | 0.116 | 0 |
| 29 | Signal | 3890 | −188 | East | P22 | 10795 | 635 | 0.119 | 0 |
| 30 | Signal | 3890 | −63 | East | R25 | 14605 | 1905 | 0.184 | 0 |
| 31 | Signal | 3890 | 63 | East | R23 | 12065 | 1905 | 0.225 | 0 |
| 32 | Signal | 3890 | 188 | East | T26 | 15875 | 3175 | 0.249 | 0 |
| 33 | Signal | 3890 | 313 | East | T25 | 14605 | 3175 | 0.267 | 0 |
| 34 | Signal | 3890 | 438 | East | T24 | 13335 | 3175 | 0.290 | 0 |
| 35 | Signal | 3890 | 563 | East | U26 | 15875 | 4445 | 0.324 | 0 |
| 36 | Signal | 3890 | 688 | East | T22 | 10795 | 3175 | 0.360 | 0 |
| 37 | Signal | 3890 | 813 | East | V25 | 14605 | 5715 | 0.457 | 0 |
| 38 | Signal | 3890 | 938 | East | W26 | 15875 | 6985 | 0.505 | 0 |
| 39 | Signal | 3890 | 1063 | East | U22 | 10795 | 4445 | 0.490 | 0 |
| 40 | Signal | 3890 | 1188 | East | W25 | 14605 | 6985 | 0.541 | 0 |
| 41 | Signal | 3890 | 1313 | East | Y26 | 15875 | 8255 | 0.579 | 0 |
| 42 | Signal | 3890 | 1438 | East | V22 | 10795 | 5715 | 0.619 | 0 |
| 43 | Signal | 3890 | 1563 | East | W23 | 12065 | 6985 | 0.663 | 0 |
| 44 | Signal | 3890 | 1688 | East | AA26 | 15875 | 9525 | 0.654 | 0 |
| 45 | Signal | 3890 | 1813 | East | Y24 | 13335 | 8255 | 0.682 | 0 |
| 46 | Signal | 3890 | 1938 | East | AA25 | 14605 | 9525 | 0.708 | 0 |
| 47 | VSS | 3890 | 2063 | East | | | | | |
| 48 | Signal | 3890 | 2188 | East | W22 | 10795 | 6985 | 0.695 | 0 |
| 49 | Signal | 3890 | 2313 | East | AB26 | 15875 | 10795 | 0.708 | 0 |
| 50 | VSS | 3890 | 2438 | East | | | | | |
| 51 | VDD | 3890 | 2563 | East | | | | | |
| 52 | Signal | 3890 | 2688 | East | Y23 | 12065 | 8255 | 0.681 | 0 |
| 53 | Signal | 3890 | 2813 | East | AB25 | 14605 | 10795 | 0.745 | 0 |
| 54 | VSS | 3890 | 2938 | East | | | | | |
| 55 | Signal | 3890 | 3063 | East | AC26 | 15875 | 12065 | 0.751 | 0 |
| 56 | Signal | 3890 | 3188 | East | AC25 | 14605 | 12065 | 0.828 | 0 |
| 57 | Signal | 3890 | 3313 | East | AD26 | 15875 | 13335 | 0.836 | 0 |
| 58 | Signal | 3890 | 3438 | East | AB23 | 12065 | 10795 | 0.900 | 0 |
| 59 | Signal | 3890 | 3563 | East | AC24 | 13335 | 12065 | 0.900 | 0 |
| 60 | Signal | 3890 | 3688 | East | AE26 | 15875 | 14605 | 0.911 | 0 |
| 61 | Signal | 3688 | 3890 | North | AC20 | 8255 | 12065 | 1.790 | 1 |
| 62 | Signal | 3563 | 3890 | North | AF22 | 10795 | 15875 | 1.657 | 1 |
| 63 | Signal | 3438 | 3890 | North | AE22 | 10795 | 14605 | 1.456 | 1 |
| 64 | Signal | 3313 | 3890 | North | AB20 | 8255 | 10795 | 1.397 | 1 |
| 65 | VSS | 3188 | 3890 | North | | | | | |
| 66 | Signal | 3063 | 3890 | North | AF23 | 12065 | 15875 | 1.331 | 2 |
| 67 | Signal | 2938 | 3890 | North | AE19 | 6985 | 14605 | 2.648 | 5 |
| 68 | VDD | 2813 | 3890 | North | | | | | |
| 69 | Signal | 2688 | 3890 | North | AE23 | 12065 | 14605 | 1.143 | 1 |
| 70 | Signal | 2563 | 3890 | North | AF24 | 13335 | 15875 | 1.113 | 1 |
| 71 | Signal | 2438 | 3890 | North | AF2S | 14605 | 15875 | 0.985 | 4 |
| 72 | Signal | 2313 | 3890 | North | AB24 | 13335 | 14605 | 0.972 | 4 |
| 73 | VDD | 2188 | 3890 | North | | | | | |
| 74 | VSS | 2063 | 3890 | North | | | | | |
| 75 | Signal | 1938 | 3890 | North | AD23 | 12065 | 13335 | 0.933 | 4 |
| 76 | VDD | 1813 | 3890 | North | | | | | |
| 77 | Signal | 1688 | 3890 | North | AB21 | 9525 | 10795 | 0.881 | 4 |
| 78 | Signal | 1563 | 3890 | North | AF26 | 15875 | 15875 | 0.837 | 4 |

TABLE 3-continued

CENTROID FILE

| # | ID | CHIPX | CHIPY | SIDE | ALPHA | BGAX | BGAY | SLOPE | CROSS |
|---|---|---|---|---|---|---|---|---|---|
| 79 | Signal | 1438 | 3890 | North | AD17 | 4445 | 13335 | 3.141 | 8 |
| 80 | Signal | 1313 | 3890 | North | AD24 | 13335 | 13335 | 0.786 | 4 |
| 81 | VDD | 1188 | 3890 | North | | | | | |
| 82 | Signal | 1063 | 3890 | North | AB16 | 3175 | 10795 | 3.269 | 7 |
| 83 | Signal | 938 | 3890 | North | AB22 | 10795 | 10795 | 0.701 | 3 |
| 84 | Signal | 813 | 3890 | North | AC16 | 3175 | 12065 | 3.461 | 8 |
| 85 | Signal | 688 | 3890 | North | AB7 | −8255 | 10795 | −0.772 | 5 |
| 86 | Signal | 563 | 3890 | North | AF16 | 3175 | 15875 | 4.588 | 10 |
| 87 | Signal | 438 | 3890 | North | AF2 | −14605 | 15875 | −0.797 | 4 |
| 88 | Signal | 313 | 3890 | North | AD5 | −10795 | 13335 | −0.850 | 4 |
| 89 | Signal | 188 | 3890 | North | AE4 | −12065 | 14605 | −0.874 | 4 |
| 90 | Signal | 63 | 3890 | North | AF3 | −13335 | 15875 | −0.895 | 4 |
| 91 | Signal | 63 | 3890 | North | AB8 | −6985 | 10795 | −0.998 | 4 |
| 92 | Signal | −188 | 3890 | North | AF4 | −12065 | 15875 | −1.009 | 4 |
| 93 | Signal | −313 | 3890 | North | AE5 | −10795 | 14605 | −1.022 | 4 |
| 94 | Signal | −438 | 3890 | North | AD6 | −9525 | 13335 | −1.039 | 5 |
| 95 | Signal | −563 | 3890 | North | AP15 | 1905 | 15875 | 4.856 | 11 |
| 96 | Signal | −688 | 3890 | North | AC7 | −8255 | 12065 | −1.080 | 4 |
| 97 | Signal | −813 | 3890 | North | AD7 | −8255 | 13335 | −1.269 | 4 |
| 98 | VSS | −938 | 3890 | North | | | | | |
| 99 | Signal | −1063 | 3890 | North | AF6 | −9525 | 15875 | −1.416 | 4 |
| 100 | Signal | −1188 | 3890 | North | AD14 | 635 | 13335 | 5.181 | 12 |
| 101 | Signal | −1313 | 3890 | North | AE14 | 635 | 14605 | 5.501 | 12 |
| 102 | Signal | −1438 | 3890 | North | AE7 | −8255 | 14605 | −1.572 | 2 |
| 103 | Signal | −1563 | 3890 | North | AF14 | 635 | 15875 | 5.453 | 13 |
| 104 | Signal | −1688 | 3890 | North | AD8 | −6985 | 13335 | −1.783 | 3 |
| 105 | Signal | −1813 | 3890 | North | AF7 | −8255 | 15875 | −1.860 | 4 |
| 106 | Signal | −1938 | 3890 | North | AC9 | −5715 | 12065 | −2.164 | 4 |
| 107 | Signal | −2063 | 3890 | North | AC13 | 635 | 12065 | 5.725 | 8 |
| 108 | Signal | −2188 | 3890 | North | AB10 | −4445 | 10795 | −3.059 | 3 |
| 109 | Signal | −2313 | 3890 | North | AF9 | −5715 | 15875 | −3.523 | 3 |
| 110 | Signal | −2438 | 3890 | North | AC10 | −4445 | 12065 | −4.073 | 3 |
| 111 | Signal | −2563 | 3890 | North | AD10 | −4445 | 13335 | −5.019 | 3 |
| 112 | Signal | −2688 | 3890 | North | AB12 | −1905 | 10795 | 8.819 | 6 |
| 113 | Signal | −2813 | 3890 | North | AE10 | −4445 | 1460S | −6.566 | 2 |
| 114 | VSS | −2938 | 3890 | North | | | | | |
| 115 | Signal | −3063 | 3890 | North | AE12 | −1905 | 14605 | 9.253 | 8 |
| 116 | Signal | −3188 | 3890 | North | AF12 | −1905 | 15875 | 9.341 | 8 |
| 117 | Signal | −3313 | 3890 | North | AF10 | −4445 | 15875 | −10.587 | 2 |
| 118 | Signal | −3438 | 3890 | North | AC11 | −3175 | 12065 | 31.084 | 1 |
| 119 | Signal | −3563 | 3890 | North | AD11 | −3175 | 13335 | 24.343 | 1 |
| 120 | VSS | −3688 | 3890 | North | | | | | |
| 121 | Signal | −3890 | 3688 | West | AB5 | −10795 | 10795 | −1.029 | 0 |
| 122 | Signal | −3890 | 3563 | West | AE1 | −15875 | 14605 | −0.921 | 0 |
| 123 | Signal | −3890 | 3438 | West | AC3 | −13335 | 12065 | −0.913 | 0 |
| 124 | Signal | −3890 | 3313 | West | AB4 | −12065 | 10795 | −0.915 | 0 |
| 125 | Signal | −3890 | 3188 | West | AA5 | −10795 | 9525 | −0.918 | 0 |
| 126 | Signal | −3890 | 3063 | West | AC2 | −14605 | 12065 | −0.840 | 0 |
| 127 | VSS | −3890 | 2938 | West | | | | | |
| 128 | Signal | −3890 | 2813 | West | AB3 | −13335 | 10795 | −0.845 | 0 |
| 129 | Signal | −3890 | 2688 | West | Y5 | −10795 | 8255 | −0.806 | 0 |
| 130 | Signal | −3890 | 2563 | West | AA3 | −13335 | 9525 | −0.737 | 0 |
| 131 | VSS | −3890 | 2438 | West | | | | | |
| 132 | Signal | −3890 | 2313 | West | AE1 | −15875 | 10795 | −0.708 | 0 |
| 133 | Signal | −3890 | 2188 | West | W5 | −10795 | 6985 | −0.695 | 0 |
| 134 | Signal | −3890 | 2063 | West | V5 | −10795 | 5715 | −0.529 | 0 |
| 135 | Signal | −3890 | 1938 | West | Y1 | −15875 | 8255 | −0.527 | 0 |
| 136 | VSS | −3890 | 1813 | West | | | | | |
| 137 | VDD | −3890 | 1688 | West | | | | | |
| 138 | Signal | −3890 | 1563 | West | V4 | −12065 | 5715 | −0.508 | 0 |
| 139 | VSS | −3890 | 1438 | West | | | | | |
| 140 | Signal | −3890 | 1313 | West | W2 | −14605 | 6985 | −0.529 | 0 |
| 141 | Signal | −3890 | 1188 | West | U5 | −10795 | 4445 | −0.472 | 0 |
| 142 | Signal | −3890 | 1063 | West | U3 | −13335 | 4445 | −0.358 | 0 |
| 143 | Signal | −3890 | 938 | West | U1 | −15875 | 4445 | −0.293 | 0 |
| 144 | Signal | −3890 | 813 | West | T3 | −13335 | 3175 | −0.250 | 0 |
| 145 | Signal | −3890 | 688 | West | T1 | −15875 | 3175 | −0.208 | 0 |
| 146 | Signal | −3890 | 563 | West | R4 | −12065 | 1905 | −0.164 | 0 |
| 147 | Signal | −3890 | 438 | West | R2 | −14605 | 1905 | −0.137 | 0 |
| 148 | VSS | −3890 | 313 | West | | | | | |
| 149 | Signal | −3890 | 188 | West | R1 | −15875 | 1905 | −0.143 | 0 |
| 150 | Signal | −3890 | 63 | West | P2 | −14605 | 635 | −0.053 | 0 |
| 151 | Signal | −3890 | −63 | West | N1 | −15875 | −635 | 0.048 | 0 |
| 152 | Signal | −3890 | −188 | West | N5 | −10795 | −635 | 0.065 | 0 |
| 153 | Signal | −3890 | −313 | West | M1 | −15875 | −1905 | 0.133 | 0 |

TABLE 3-continued

CENTROID FILE

| # | ID | CHIPX | CHIPY | SIDE | ALPHA | BGAX | BGAY | SLOPE | CROSS |
|---|---|---|---|---|---|---|---|---|---|
| 154 | Signal | −3890 | −438 | West | M2 | −14605 | −1905 | 0.137 | 0 |
| 155 | Signal | −3890 | −563 | West | M3 | −13335 | −1905 | 0.142 | 0 |
| 1S6 | Signal | −3890 | −688 | West | M5 | −10795 | −1905 | 0.176 | 0 |
| 157 | VDD | −3890 | −813 | West | | | | | |
| 158 | Signal | −3890 | −938 | West | L1 | −15875 | −3175 | 0.187 | 0 |
| 159 | VDD | −3890 | −1063 | West | | | | | |
| 160 | Signal | −3890 | −1188 | West | L2 | −14605 | −3175 | 0.185 | |
| 161 | Signal | −3890 | −1313 | West | L4 | −12065 | −3175 | 0.228 | 0 |
| 162 | VDD | −3890 | −1438 | West | | | | | |
| 163 | Signal | −3890 | −1563 | West | L5 | −10795 | −3175 | 0.233 | 0 |
| 164 | Signal | −3890 | −1688 | West | K1 | −15875 | −4445 | 0.230 | 0 |
| 165 | Signal | −3890 | −1813 | West | K2 | −14605 | −4445 | 0.246 | 0 |
| 166 | Signal | −3890 | −1938 | West | J1 | −15875 | −5715 | 0.315 | 0 |
| 167 | Signal | −3890 | −2063 | West | J2 | −14605 | −5715 | 0.341 | 0 |
| 168 | Signal | −3890 | −2188 | West | K5 | −10795 | −4445 | 0.327 | 0 |
| 169 | Signal | −3890 | −2313 | West | J3 | −13335 | −5715 | 0.360 | 0 |
| 170 | Signal | −3890 | −2438 | West | J4 | −12065 | −5715 | 0.401 | 0 |
| 171 | VSS | −3890 | −2563 | West | | | | | |
| 172 | Signal | −3890 | −2688 | West | H3 | −13335 | −6985 | 0.455 | 0 |
| 173 | Signal | −3890 | −2813 | West | F1 | −15875 | −9525 | 0.560 | 0 |
| 174 | Signal | −3890 | −2938 | West | E2 | −14605 | −10795 | 0.733 | 0 |
| 175 | Signal | −3890 | −3063 | West | G5 | −10795 | −8255 | 0.752 | 0 |
| 176 | VDD | −3890 | −3188 | West | | | | | |
| 177 | VSS | −3890 | −3313 | West | | | | | |
| 178 | Signal | −3890 | −3438 | West | F4 | −12065 | −9525 | 0.745 | 0 |
| 179 | Signal | −3890 | −3563 | West | F5 | −10795 | −9525 | 0.863 | 0 |
| 180 | Signal | −3890 | −3688 | West | C2 | −14605 | −13335 | 0.900 | 0 |
| 181 | Signal | −3688 | −3890 | South | D10 | −4445 | −12065 | 10.799 | 0 |
| 182 | Signal | −3563 | −3890 | South | B10 | −4445 | −14605 | 12.149 | 0 |
| 183 | Signal | −3438 | −3890 | South | A10 | −4445 | −15875 | 11.902 | 0 |
| 184 | Signal | −3313 | −3890 | South | E10 | −4445 | −10795 | 6.100 | 0 |
| 185 | Signal | −3188 | −3890 | South | C9 | −5715 | −13335 | 3.738 | 0 |
| 186 | Signal | −3063 | −3890 | South | D9 | −5715 | −12065 | 3.083 | 1 |
| 187 | Signal | −2938 | −3890 | South | A8 | −6985 | −15875 | 2.961 | 2 |
| 188 | Signal | −2813 | −3890 | South | B8 | −6985 | −14605 | 2.568 | 2 |
| 189 | Signal | −2688 | −3890 | South | E11 | −3175 | −10795 | 14.179 | 3 |
| 190 | VSS | −2563 | −3890 | South | | | | | |
| 191 | Signal | −2438 | −3890 | South | D11 | −3175 | −12065 | 11.092 | 2 |
| 192 | Signal | −2313 | −3890 | South | 39 | −5715 | −10795 | 2.030 | 0 |
| 193 | Signal | −2188 | −3890 | South | A7 | −8255 | −15875 | 1.975 | 0 |
| 194 | VSS | −2063 | −3890 | South | | | | | |
| 195 | Signal | −1938 | −3890 | South | B7 | −8255 | −14605 | 1.696 | 0 |
| 196 | Signal | −1813 | −3890 | South | D8 | −6985 | −12065 | 1.581 | 2 |
| 197 | VSS | −1688 | −3890 | South | | | | | |
| 198 | Signal | −1563 | −3890 | South | C7 | −8255 | −13335 | 1.411 | 2 |
| 199 | Signal | −1438 | −3890 | South | D12 | −1905 | −12065 | 17.505 | 2 |
| 200 | Signal | −1313 | −3890 | South | B12 | −1905 | −14605 | 18.100 | 2 |
| 201 | Signal | −1188 | −3890 | South | A5 | −10795 | −15875 | 1.248 | 0 |
| 202 | Signal | −1063 | −3890 | South | C6 | −9525 | −13335 | 1.116 | 0 |
| 203 | Signal | −938 | −3890 | South | B5 | −10795 | −14605 | 1.087 | 0 |
| 204 | Signal | −813 | −3890 | South | A4 | −12065 | −15875 | 1.065 | 0 |
| 205 | Signal | −688 | −3890 | South | B4 | −12065 | −14605 | 0.942 | 0 |
| 206 | Signal | −S63 | −3890 | South | A2 | −14605 | −15875 | 0.854 | 2 |
| 207 | Signal | −438 | −3890 | South | D5 | −10795 | −12065 | 0.789 | 2 |
| 208 | Signal | −313 | −3890 | South | E6 | −9525 | −10795 | 0.750 | 2 |
| 209 | Signal | −188 | −3890 | South | C3 | −13335 | −13335 | 0.718 | 2 |
| 210 | Signal | −63 | −3890 | South | C13 | −635 | −13335 | 16.512 | 4 |
| 211 | Signal | 63 | −3890 | South | B13 | −635 | −14605 | 15.351 | 4 |
| 212 | Signal | 188 | −3890 | South | D23 | 12065 | −12065 | −0.688 | 0 |
| 213 | Signal | 313 | −3890 | South | B25 | 14605 | −14605 | −0.750 | 0 |
| 214 | Signal | 438 | −3890 | South | D22 | 10795 | −12065 | −0.789 | 0 |
| 215 | Signal | 563 | −3890 | South | B24 | 13335 | −14605 | −0.839 | 0 |
| 216 | Signal | 688 | −3890 | South | A25 | 14605 | −15875 | −0.861 | 2 |
| 217 | Signal | 813 | −3890 | South | A24 | 13335 | −15875 | −0.957 | 2 |
| 218 | Signal | 938 | −3890 | South | D20 | 8255 | −12065 | −1.117 | 2 |
| 219 | Signal | 1063 | −3890 | South | E19 | 6985 | −10795 | −1.166 | 2 |
| 220 | Signal | 1188 | −3890 | South | B14 | 635 | −14605 | 19.376 | 4 |
| 221 | VSS | 1313 | −3890 | South | | | | | |
| 222 | Signal | 1438 | −3890 | South | A14 | 635 | −15875 | 14.925 | 4 |
| 223 | Signal | 1563 | −3890 | South | C20 | 8255 | −13335 | −1.411 | 0 |
| 224 | Signal | 1688 | −3890 | South | D19 | 6985 | −12065 | −1.543 | 0 |
| 22S | Signal | 1813 | −3890 | South | B20 | 8255 | −14605 | −1.663 | 0 |
| 226 | Signal | 1938 | −3890 | South | E18 | 5715 | −10795 | −1.828 | 4 |
| 227 | Signal | 2063 | −3890 | South | C19 | 6985 | −13335 | −1.919 | 4 |
| 228 | Signal | 2188 | −3890 | South | D18 | 5715 | −12065 | −2.318 | 4 |

TABLE 3-continued

CENTROID FILE

| # | ID | CHIPX | CHIPY | SIDE | ALPHA | BGAX | BGAY | SLOPE | CROSS |
|---|---|---|---|---|---|---|---|---|---|
| 229 | Signal | 2313 | −3890 | South | E15 | 1905 | −10795 | 16.924 | 3 |
| 230 | Signal | 2438 | −3890 | South | D15 | 1905 | −12065 | 15.338 | 3 |
| 231 | Signal | 2563 | −3890 | South | B15 | 1905 | −14605 | 16.284 | 3 |
| 232 | Signal | 2688 | −3890 | South | A15 | 1905 | −15875 | 15.307 | 3 |
| 233 | VSS | 2813 | −3890 | South | | | | | |
| 234 | VDD | 2938 | −3890 | South | | | | | |
| 235 | Signal | 3063 | −3890 | South | D17 | 4445 | −12065 | −5.915 | 0 |
| 236 | Signal | 3188 | −3890 | South | A17 | 4445 | −15875 | −9.535 | 3 |
| 237 | Signal | 3313 | −3890 | South | C16 | 3175 | −13335 | 68.442 | 1 |
| 238 | Signal | 3438 | −3890 | South | B16 | 3175 | −14605 | 40.741 | 1 |
| 239 | Signal | 3563 | −3890 | South | A16 | 3175 | −15875 | 30.889 | 1 |
| 240 | VDD | 3688 | −3890 | South | | | | | |

Summary file 112 includes six tables:

(1) Table 4: chip statistics (die size, die pitch, die pad size, and die matrix size), chip input/output total and per quadrant, number of signals total and per quadrant, ground and voltage pads on the chip total and per quadrant.

(2) Table 5: module statistics, including module input/output input parameter, number of signal pads, voltage and ground pads, percent number of signal BGA pads per total BGA pads, percent number of ground and voltage BGA pads per total ground and voltage BGA pads; module laminate size; BGA pad pitch; BGA matrix size (rows by columns); full matrix or depopulated matrix identifier; die facing parameter (whether die pads are facing toward or away from carrier); enumerate the number of voltage rings; wire bond length, space for fingers plus fan out wiring, space for fan out wiring;

(3) Table 6: truth table for testing that five required parameters (Table 7) evaluate true, as follows:

first, wiring distance between wire bond fingers and either (a) the edge of via lands on an upper facing die, or (b) either the procoat opening or copper diameter of BGA pads on a downward facing die;

second, enough BGA pads for number of chip signal pads;

third, enough wiring channel capacity to match total die signal count (Referring to FIG. 3, wiring channel 123 represents the spacing between adjacent procoat openings for downward facing die, and wiring channel 125 represents the spacing between via pad 136 and closest via pad 138) for, based on the amount of depopulation, the number of channels is calculated and multiplied by three lines per channel and four lines per channel;

forth, calculated wire line width compared with minimum manufacturing line width capability (which is an input requirement);

fifth, calculated wire line space compared with minimum manufacturing line space capability (which is an input requirement);

(4) Tables 8 and 9: calculated density factors, including first, calculated choke factor (choke=channel space divided by (line space plus the line width)), back door vias (vias located in the space between the inner most edge of bond finger on the laminate and the outer most edge of the most outer voltage ring);

second, chip escape factor (die area divided by number of chip signal pads);

third, chip density factor (die area divided by number of chip I/O pads); and fourth, BGA escape factor ((laminate area minus die area)/number of chip signals), for giving an estimate of density of wiring in the global area of the laminate for chip escape.

(5) Tables 10 and 11: gold area, including BOA pads, cavity wall (for wire bond), via areas, wiring surface front and back, wire bonding surfaces, gold stiffener (if included), including total area and cost, and minimum total thermal resistance required based on ambient temperature, chip power, and junction temperature.

(6) Tables 12 and 13: other miscellaneous statistics and parameters.

TABLE 4

CHIP STATISTICS

Die Size = 8.00 mm × 8.00 mm

Die Pitch = 125 microns

Die Pad Size = 70 microns

The Die Matrix = 60 × 60

| Chip I/O (total/side) | Chip Signals %/#Side | Chip G&V %/#Side |
|---|---|---|
| 240/60 | 85.0%/51/204 | 15.0%/9/36 |

TABLE 5

MODULE STATISTICS

| Module I/O Count | Signal Ratio/Signal Count | G/V Ratio/G/V |
|---|---|---|
| 420 | 48.6%/204 | 51.4%/216 |

Module Size = 35 mm

BGA Pitch = 1.27 mm

Matrix Size = 26 × 26

This is a 5 outer row configuration

This is run is for a cavity part.

This is run is for a 2S0P part.

There are 1 voltage ring(s) in addition to the Ground Ring

TABLE 6

TRUTH TABLE

| # Outer Rows | I/O Count | Signals @3 | 1 pc | Signals @4 | 1 pc | Wiring Fanout | Multiples of Pitch | Deficit @3 | Deficit @4 | Works @3 | Works @4 |
|---|---|---|---|---|---|---|---|---|---|---|---|
| 1 | 100 | 97/ | 388 | 121/ | 484 | 9.06 | 77.251 | −44 | −68 | n.YNYYY | n.YNYYY |
| 2 | 192 | 89/ | 356 | 111/ | 444 | 7.79 | 66.424 | −36 | −58 | n.YNYYY | n.YNYYY |
| 3 | 276 | 81/ | 324 | 101/ | 404 | 6.52 | 55.597 | −28 | −48 | y.YYYYY | y.YYYYY |
| 4 | 352 | 73/ | 292 | 91/ | 364 | 5.25 | 44.770 | −20 | −38 | y.YYYYY | y.YYYYY |
| 5 | 420 | 65/ | 260 | 81/ | 324 | 3.98 | 33.943 | −12 | −28 | y.YYYYY | y.YYYYY |
| 6 | 480 | 57/ | 228 | 71/ | 284 | 2.71 | 23.116 | −4 | −18 | y.YYYYY | y.YYYYY |
| 7 | 532 | 49/ | 196 | 61/ | 244 | 1.44 | 12.289 | 4 | −8 | n.YYNYY | y.YYYYY |
| 8 | 576 | 41/ | 164 | 51/ | 204 | 0.17 | 1.462 | 12 | 2 | n.NYNYY | n.NYNYY |
| 9 | 612 | 33/ | 132 | 41/ | 164 | −1.10 | −9.365 | 20 | 12 | n.NYNYY | n.NYNYY |
| 10 | 640 | 25/ | 100 | 31/ | 124 | −2.37 | −20.192 | 28 | 22 | n.NYNYY | n.NYNYY |
| 11 | 660 | 17/ | 68 | 21/ | 84 | −3.64 | −31.019 | 36 | 32 | n.NYNYY | n.NYNYY |
| 12 | 672 | 9/ | 36 | 11/ | 44 | −4.91 | −41.846 | 44 | 42 | n.NYNYY | n.NYNYY |
| 13 | 676 | 1/ | 4 | 1/ | 4 | −6.18 | −52.673 | 52 | 52 | n.NYNYY | n.NYNYY |

TABLE 7

PARAMETERS TEST OUTPUT

First Position = Enough Wiring Room after Fingers (non-Choked)

Second Position = Enough BGA Balls for Chip Signals

Third Position = Enough Channel Capacity to match Signal Count

Fourth Position = Wire Width above Minimum

Fifth Position = Wire to Wire Space above Minimum

TABLE 8

WIRE DIMENSION AND PITCH

Nominal Wire Bond Length is 2.4 mm.
Space for fingers plus fanout wiring 6.05 mm
Space for fanout wiring is 3.98 mm
Multiples of Pitch (Lower is more choked) 33.9
Back Door Vias selected (per Quadrant) is 10
Lines per Channel Selected is 4
Corresponding Line Width, Space, and Pitch is 51.0, 66.3,and 117.3 microns.
Procoat Registration is 25 microns.

| Lines/ Channel | Wire Width | Wire Space | Wire Pitch |
|---|---|---|---|
| 1 | 148.6 | 193.2 | 341.8 |
| 2 | 90.7 | 117.9 | 208.6 |
| 3 | 65.2 | 84.8 | 150.0 |
| 4 | 51.0 | 66.3 | 117.3 |
| 5 | 41.8 | 54.3 | 96.1 |
| 6 | 35.4 | 46.0 | 81.4 |

TABLE 9

ESCAPE FACTORS

| | |
|---|---|
| Chip Escape Factor (die area/chipsigs)is | 0.31 sq mm/chipsig |
| Chip Density Factor (die area/chipio)is | 0.27 sq mm/chipio |
| BGA Escape Factor (laminate area-die shadow/chipsig) is | 5.7 sq mm/chipsig |

TABLE 10

DIE UP

| | |
|---|---|
| Total Gold Area on a die up | 0.36 sq. inches |
| Cost of Gold Area on a die up | 0.03 dollars |
| Flower Area is | 0.08 sq. inches |
| Bonding Surface (Fingers, Voltage Ring, Ground Ring) | 0.055 |
| Via Land Area on S2 side | 0.001 |
| Ground Buss on S2 Side | 0.019 |
| BGA Area is | 0.202 |
| Gold Runner area is | 0.008 |
| Wiring Gold on a Die Up Part is assumed to be masked | |
| Via Count for Die-Up Part is | 206 |

TABLE 11

CAVITY PART

| | |
|---|---|
| Total Gold Area on a Cavity Part (minus Stiffener) | 1.00 sq. inches |
| Gold Stiffener Area is | 1.90 sq. inches |
| Total Gold Area Cost on a Cavity Part (with Stiffener) | 0.28 dollars |
| Bonding Surface (Fingers, Voltage Ring, Ground Ring) | 0.055 |
| Wiring Front and Back (from fingers out) | 0.668 |
| BOA Pads | 0.202 |
| Cavity Wall | 0.022 |
| Via Area | 0.054 |
| Via Count for Cavity Part is | 77 |

TABLE 12

MISCELLANEOUS

| | |
|---|---|
| Flatness per inch | 2.07 |
| Cavity size is | 9.00 mm |

TABLE 13

| THERMALS | |
|---|---|
| Ambient Temperature is | 40 C. |
| Chip Power is | 10 watts. |
| Assumed Maximum Junction Temperature is | 125 |
| Minimum Total Resistance needed is | 8.5 C./Watt |

Crossing file 114 includes four columns, including:

(1) chip pad number (same as centroid data, supra);

(2) quadrant (north, west, east, or south);

(3) BGA pad; and (4) number of lines that have crossed the die pad to BGA pad line.

Code 102 analyzes each connection line for the number of times any other connection line crosses it. The more crosses, the tougher the design. This file is sorted in descending order of number of crossings, so that the top of the file identifies the lines (or, nets) that are not well placed. Table 14 is an example of the top part of a crossing file 114.

TABLE 14

CROSSINGS FILE

| | CHIP PAD | | QUADRANT | BGA PAD | CROSSINGS |
|---|---|---|---|---|---|
| 1 | 103 | Signal | North | AF14 | 13 |
| 2 | 100 | Signal | North | AD14 | 12 |
| 3 | 101 | Signal | North | AE14 | 12 |
| 4 | 95 | Signal | North | AF15 | 11 |
| 5 | 86 | Signal | North | AF16 | 10 |
| 6 | 79 | Signal | North | AD17 | 8 |
| 7 | 84 | Signal | North | AC16 | 8 |
| 8 | 107 | Signal | North | AC13 | 8 |
| 9 | 115 | Signal | North | AE12 | 8 |
| 10 | 116 | Signal | North | AF12 | 8 |
| 11 | 82 | Signal | North | AB16 | 7 |
| 12 | 112 | Signal | North | AB12 | 6 |
| 13 | 67 | Signal | North | AE19 | 5 |
| 14 | 85 | Signal | North | AB7 | 5 |
| 15 | 94 | Signal | North | AD6 | 5 |
| 16 | 71 | Signal | North | AF25 | 4 |
| 17 | 72 | Signal | North | AE24 | 4 |
| 18 | 75 | Signal | North | AD23 | 4 |
| 19 | 77 | Signal | North | AB21 | 4 |
| 20 | 78 | Signal | North | AF26 | 4 |
| 21 | 80 | Signal | North | AD24 | 4 |
| 22 | 87 | Signal | North | AF2 | 4 |
| 23 | 88 | Signal | North | AD5 | 4 |
| 24 | 89 | Signal | North | AE4 | 4 |
| 25 | 90 | Signal | North | AF3 | 4 |
| 26 | 91 | Signal | North | AB8 | 4 |
| 27 | 92 | Signal | North | AF4 | 4 |
| 28 | 93 | Signal | North | AE5 | 4 |
| 29 | 96 | Signal | North | AC7 | 4 |
| 30 | 97 | Signal | North | AD7 | 4 |
| 31 | 99 | Signal | North | AF6 | 4 |
| 32 | 105 | Signal | North | AF7 | 4 |
| 33 | 106 | Signal | North | AC9 | 4 |
| 34 | 210 | Signal | South | C13 | 4 |
| 35 | 211 | Signal | South | B13 | 4 |
| 36 | 220 | Signal | South | B14 | 4 |
| 37 | 222 | Signal | South | A14 | 4 |
| 38 | 226 | Signal | South | E18 | 4 |
| 39 | 227 | Signal | South | C19 | 4 |
| 40 | 228 | Signal | South | D18 | 4 |
| 41 | 83 | Signal | North | AB22 | 3 |
| 42 | 104 | Signal | North | AD8 | 3 |
| 43 | 108 | Signal | North | AB10 | 3 |
| 44 | 109 | Signal | North | AF9 | 3 |
| 45 | 110 | Signal | North | AC10 | 3 |
| 46 | 111 | Signal | North | AD10 | 3 |
| 47 | 189 | Signal | South | E11 | 3 |
| 48 | 229 | Signal | South | E15 | 3 |
| 49 | 230 | Signal | South | D15 | 3 |
| 50 | 231 | Signal | South | B15 | 3 |
| 51 | 232 | Signal | South | A15 | 3 |
| 52 | 236 | Signal | South | A17 | 3 |
| 53 | 66 | Signal | North | AF23 | 2 |
| 54 | 102 | Signal | North | AE7 | 2 |
| 55 | 113 | Signal | North | AE10 | 2 |
| 56 | 117 | Signal | North | AF10 | 2 |
| 57 | 187 | Signal | South | A8 | 2 |
| 58 | 188 | Signal | South | B8 | 2 |
| 59 | 191 | Signal | South | D11 | 2 |
| 60 | 196 | Signal | South | D8 | 2 |
| 61 | 198 | Signal | South | C7 | 2 |
| 62 | 199 | Signal | South | D12 | 2 |
| 63 | 200 | Signal | South | B12 | 2 |
| 64 | 206 | Signal | South | A2 | 2 |
| 65 | 207 | Signal | South | D5 | 2 |
| 66 | 208 | Signal | South | E6 | 2 |
| 67 | 209 | Signal | South | C3 | 2 |
| 68 | 216 | Signal | South | A25 | 2 |
| 69 | 217 | Signal | South | A24 | 2 |
| 70 | 218 | Signal | South | D20 | 2 |
| 71 | 219 | Signal | South | E19 | 2 |
| 72 | 61 | Signal | North | AC20 | 1 |
| 73 | 62 | Signal | North | AF22 | 1 |
| 74 | 63 | Signal | North | AE22 | 1 |
| 75 | 64 | Signal | North | AB20 | 1 |
| 76 | 69 | Signal | North | AE23 | 1 |
| 77 | 70 | Signal | North | AF24 | 1 |
| 78 | 118 | Signal | North | AC11 | 1 |
| 79 | 119 | Signal | North | AD11 | 1 |
| 80 | 186 | Signal | South | D9 | 1 |
| 81 | 237 | Signal | South | C16 | 1 |
| 82 | 238 | Signal | South | B16 | 1 |
| 83 | 239 | Signal | South | A16 | 1 |
| 84 | 1 | Signal | East | E22 | 0 |
| 85 | 2 | Signal | East | C24 | 0 |
| 86 | 3 | Signal | East | A26 | 0 |

An optional output is illustrated, in part, in Table 15. Holes.txt is a file that gives the X, Y coordinates of where vias are positioned next to BGAs. These are calculated by code 102 from input parameters 100.

TABLE 15

HOLES

| X COORD | Y COORD |
|---|---|
| 11102.5885 | −11102.5885 |
| 11102.5885 | −9832.5885 |
| 11102.5885 | −8562.5885 |
| 11102.5885 | −7292.5885 |
| 11102.5885 | −6022.5885 |
| 11102.5885 | −4752.5885 |
| 11102.5885 | −3482.5885 |
| 11102.5885 | −2212.5885 |
| 11102.5885 | −942.5885 |
| 11102.5885 | 942.5885 |
| 11102.5885 | 2212.5885 |
| 11102.5885 | 3482.5885 |
| 11102.5885 | 4752.5885 |
| 11102.5885 | 6022.5885 |
| 11102.5885 | 7292.5885 |
| 11102.5885 | 8562.5885 |
| 11102.5885 | 9832.5885 |

TABLE 15-continued

| HOLES | |
|---|---|
| X COORD | Y COORD |
| 12372.5885 | −11102.5885 |
| 9832.5885 | 13642.5885 |
| 9832.5885 | 14912.5885 |
| 9832.5885 | 16182.5885 |
| 11102.5885 | 11102.5885 |
| 11102.5885 | 12372.5885 |
| 11102.5885 | 13642.5885 |
| 11102.5885 | 14912.5885 |
| 11102.5885 | 16182.5885 |
| 12372.5885 | 13642.5885 |
| 12372.5885 | 14912.5885 |
| 12372.5885 | 16182.5885 |
| 13642.5885 | 13642.5885 |
| 13642.5885 | 14912.5885 |
| 13642.5885 | 16182.5885 |
| 14912.5885 | 16182.5885 |
| 16182.5885 | 16182.5885 |

Wireable text file 116 (Tables 16 and 17) is multi-purpose. It provides a code 102 generated count of consecutive (that is, runs) signals or grounds or voltages—the larger the run of signals, the more difficult it is to wire. Code 102 scans the netlist which has either been generated or received as input, identifies the power and ground names and quadrant, and determines the number of wirebond finger positions needed.

Wireable text file 116 has two parts:

(1) Table 16: runs analysis, in which for each of the four quadrants runs are defined by the number of consecutive signals or consecutive power and ground lines, number of wirebond fingers needed per side, and a total number of die pads, signal pads, and ground/voltage pads.

(2) Table 17: net list scan, whether fabricated by program or provided as input, that enumerates the different voltage levels per quadrant.

TABLE 16

| WIREABLE TEXT FILE - RUNS | | | |
|---|---|---|---|
| Run | Side | Signal | Ground |
| 1 | East | 0 | 4 |
| 2 | East | 2 | 2 |
| 6 | East | 2 | 0 |
| 7 | East | 1 | 0 |
| 9 | East | 1 | 0 |
| 20 | East | 1 | 0 |
| Total Fingers needed for this side is 54 | | | |
| Total Pads, Signal Pads, Gnd/Vlt Pads 60 52 8 | | | |
| 1 | North | 1 | 7 |
| 2 | North | 1 | 1 |
| 4 | North | 3 | 0 |
| 5 | North | 1 | 0 |
| 15 | North | 1 | 0 |
| 16 | North | 1 | 0 |
| Total Fingers needed for this side is 52 | | | |
| Total Pads, Signal Pads, Gnd/Vlt Pads 60 51 9 | | | |
| 1 | West | 2 | 8 |
| 2 | West | 1 | 2 |
| 3 | West | 2 | 0 |
| 4 | West | 2 | 0 |
| 6 | West | 1 | 0 |
| 8 | West | 3 | 0 |
| Total Fingers needed for this side is 50 | | | |
| Total Pads, Signal Pads, Gnd/Vlt Pads 60 48 12 | | | |
| 1 | South | 0 | 5 |
| 2 | South | 1 | 1 |
| 3 | South | 1 | 0 |
| 5 | South | 1 | 0 |

TABLE 16-continued

| WIREABLE TEXT FILE - RUNS | | | |
|---|---|---|---|
| Run | Side | Signal | Ground |
| 9 | South | 1 | 0 |
| 11 | South | 1 | 0 |
| 23 | South | 1 | 0 |
| Total Fingers needed for this side is 54 | | | |
| Total Pads, Signal Pads, Gnd/Vlt Pads 60 53 7 | | | |

TABLE 17

| NET LIST SCAN | | |
|---|---|---|
| # | Power/Ground | Side |
| 1 | VDD | East |
| 2 | VSS | East |
| 1 | VSS | North |
| 2 | VDD | North |
| 1 | VSS | West |
| 2 | VDD | West |
| 1 | VSS | South |
| 2 | VDD | South |

Code 102 also generates script file 118. A session is opened in Autocad to run script file 118 to create therefrom graphical file 106.

Table 17 is a pseudo code representation of the process implemented by code 102 for generating script file 118. This is the script file that is "played" when in the Autocad environment to generate graphical representation 106, a display of which is shown in FIG. 2. In a preferred embodiment, script file 118 is an Autocad script file, but equivalent computer automated design (CAD) environments may also be used. This Table 17 sets forth editing friendly code within code 102 for the "RATS". Rats is a term referring to a straight line that emanates from the center of a die pad 178 to a BGA ball 180. It is then manipulated by moving within a layer and/or placing part of the path on other layers of the package 144. In this case, the centroid data of the die has been created and routed out to the center of the BGA pad; either by customer definition (Case "C") or by creation within the program 102 (Case "A").

As is set forth in Table 17, code 102 creates a line or rat from (Chipx, Chipy) to (BGAx, BGAy). This line is multi-verticed. Each rat has a width that is first zero and then increments to a final value with steps in the middle. It is stepped larger and larger as processing and graphical display moves counter clockwise (CCW) around the die. After code 102 creates the rats, Autocad displays graphical file 106 which shows where rats come from relative to the die sequence without having to window out and over to the die or having to select the wire to have a dialog box displayed. At the end of processing, all the wires are then converted to one width. Alternatively to using different line widths, the graphic display may use different colors.

TABLE 17

SCRIPT FILE GENERATION

```
/* RATS              */
if rats=1 then do    /* Indicator in the program to have
                     RATS created*/
                     /*ratsline is the name of the matrix
                     that is a line for line autocad script
```

TABLE 17-continued

SCRIPT FILE GENERATION

```
                text file. The variable index is
                line1, line2......*/
ratsline.index='-layer set Rats'  /* Autocad command that
                creates a layer with
                Autocad that all RATS
                are drawn in; this is a
                drawing organization
                technique* /
index=index+1       /* increment index to write to the
                next line*/
do yy=1 to chipio   /* start stepping through the centroid
                file line for line by incrementing
                line.yy matrix */
                /*# lab xc yc sd an xb yb s */
parse value line.yy with v1 v2 v3 v4 v5 v6 v7 v8 v9
                /* Take the Centroid Data file; read
                the line and parse the string by using
                the blanks as demarcation*/
Select
when v6=''then do   /*V6 is the Alpha Numeric; when v6
                is null, this is either a ground
                or voltage, not a die to end BGA
                signal connection*/
otherwise           /* the line has to be a signal*/
xfrom=v3;yfrom=v4   /* Start point is the die pad
                centroid*/
xinc=(v7-v3)/linesegments;yinc=(v8-v4)/linesegments
                /* take the distance in both the x
                and y dimension from the die pad
                to the BGA and divide it by the
                number of segments selected in
                code above in program; this will
                give each vertex of the line.*/
rat=''              /* give the string rat an initial
                value of null string*/
                /* note in REXX "||" is the
                concatenation operator; it joins
                text that is with quote marks*/
do ratpoint=1 to (linesegments+1)  /* start creating
                each point defining
                the vertices*/
Select
when ratpoint=1 then do   /* first point will be
                the die pad centroid*/
rat=rat||v3||','||v4||''  /* create the string
                that will become part of
                the autocad command
                language*/
end
when ratpoint=linesegments+1 then do
                /* end point will be the BGA
                pad centroid*/
rat=rat||v7||','||v8||''  /* create the string
                that will become part of
                the autocad command
                language*/
end
otherwise           /* defining a vertex point
                other than the endpoints of
                the RAT*/
xto=xfrom+xinc;yto=yfrom+yinc
rat=rat||xto||','||yto||''   /*This keeps
                accumulating the
                string of vertices
                into one string*/
xfrom=xto;yfrom=yto  /* This makes the vertex that
                was defined as "to", as the
                "from" so the next point can
                be calculated*/
end                 /* the Select*/
end                 /* Do loop*/
ratsline.index='pline '||rat  /* Autocad language command:
                pline x1 y1 x2 y2 x3 y3,
                etc*/
index=index+1       /* next line of the Autocad Script
                File ratsline.index*/
```

TABLE 17-continued

SCRIPT FILE GENERATION

```
if ratwidth>ratwidthmax then ratwidth=1
                /* if Rat width (line width)
                reaches a number greater than what
                was set, then set back to 1
                micron*/
ratsline.index='width '||ratwidth  /* Create Autocad
                command that specifies
                the width of line by the
                command followed by the
                width as a numeric*/
index=index+1       /* next line of the Autocad Script
                File ratsline.index*/
ratsline.index=blankline  /* Need a blankline to
                toggle the Autocad Program to
                go back to "Command:"
                Prompt*/
index=index+1       /* next line of the Autocad Script
                File ratsline.index*/
ratwidth=ratwidth+ratwidthinc  /*increment the width of the
                line for the next Rat created
                in the next loop*/
end                 /*Select*/
end                 /*Do Loop*/
end                 /*End the If statement on whether
                Rats are part of the script*/
```

Depopulation refers to removal of a center most matrix of BGA balls to leave some number of outside rows. This is done to remove balls immediately under the chip site.

Referring to FIG. 2, an example output of graphical file 106 is illustrated for a wire bond constructed module. This shows an annotated plan view of a module 140 including chip 142, laminate 144 which includes wires 146 interconnecting chip pads 142 with BGA site 150 and associated via. This is further illustrated in FIGS. 7 and 8 where BGA site 150 includes BGA 156, procoat opening 154, procoat layer 152, substrate layers 164, top side 160 of plated through via 158, dogbone 162 (a dogbone is a connector between BGA pad 156 and via 160).

Voltage ring 166 is a continuous surface of constant width, generally, that is offset from and encompasses or surrounds chip 142 site. Some wires (the power and ground wires) from chip pads 148 connect to voltage rings 166. The innermost voltage ring 166 is usually the ground level. (For a flip chip constructed module, voltage rings 166 are not required.) Wire bond fingers 210, shown in FIG. 9, are not shown in FIG. 2. These are oblong shaped copper features that are placed between rings 166 and BGA procoat opening 154 in a die down configuration or between rings 166 and via lands 160 in a die up configuration.

Figure 5:
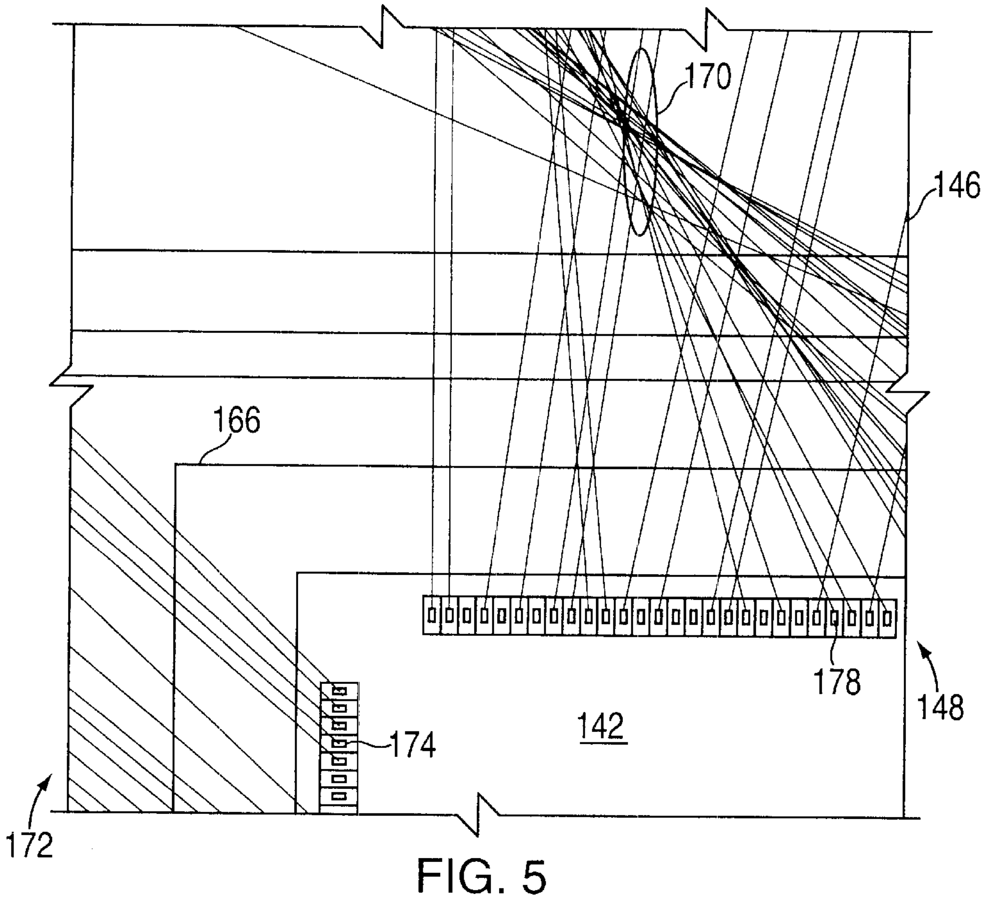
FIG. 5 is an enlarged view of a section of FIG. 2B illustrating cross over.
Figure 6:
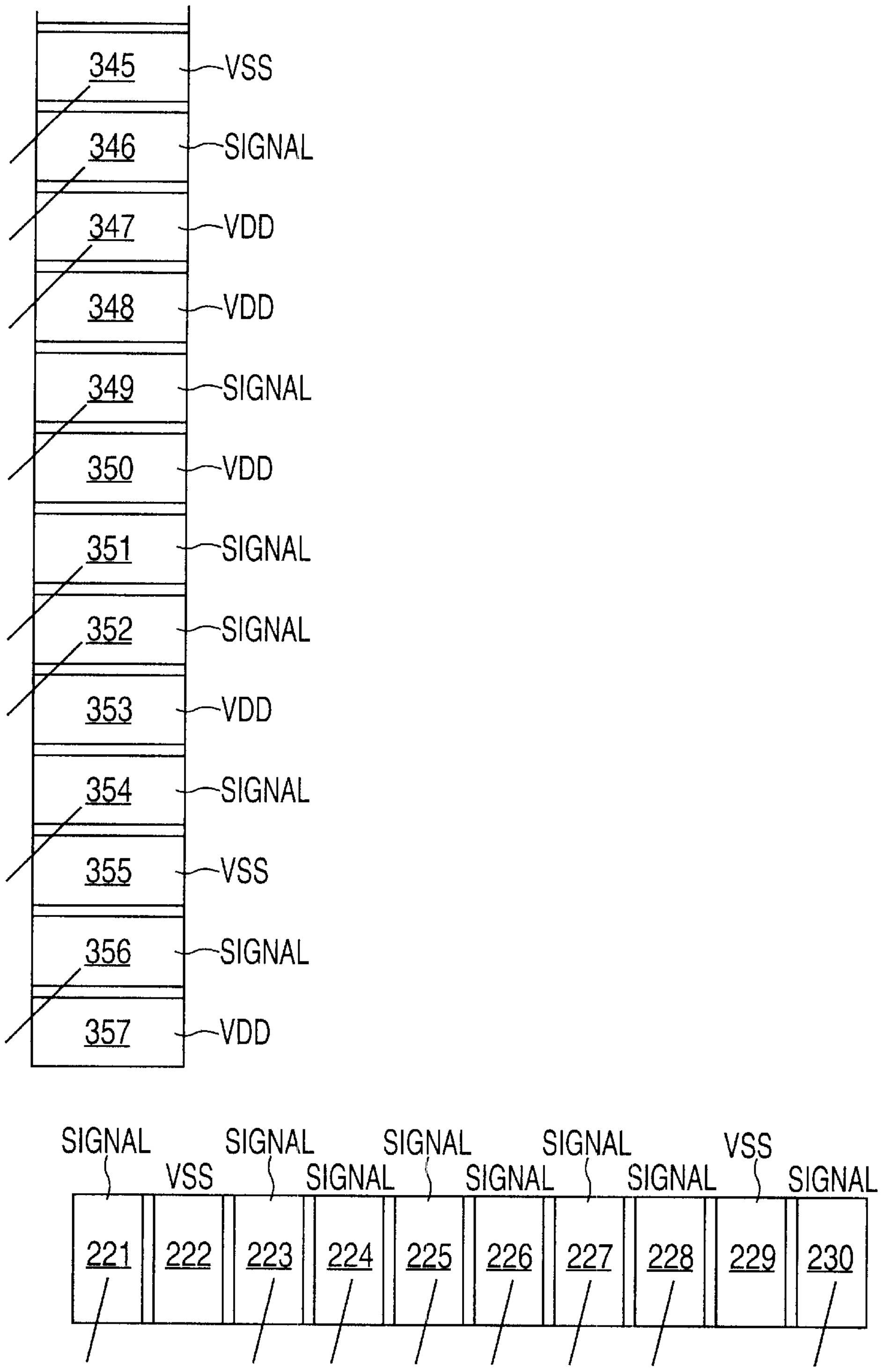
FIG. 6 is an enlarged view of a portion of FIG. 2B illustrating chip attach region labeling in accordance with the invention.

As shown in FIG. 2, and enlarged in FIG. 5, which is an enlargement of the north west corner of FIG. 2, on the west side there are circuit lines 172 which run between die pads 174 and BGA sites 176 (which only appear in FIG. 2) without crossover. On the north side, extensive cross over 170 occurs for lines interconnecting die pads 178 and BGA sites 180.

FIG. 11 sets forth method steps executed within code module 102, and these are further described in the pseudo code representation of Table 1.

Set analysis step 210 controls the files 106–116 to be output, and the run mode. The user may specify the pitch of the die or the number of die I/O desired. Also, the user may specify the number of outer rows (matrix size minus (the depopulation divided by 2)) or the number of BGA I/O pads desired.

Set variables step 212 defines cases A, B and C. For case A, the user tells the program 102 that the die and net list are to be calculated by code 102 (that is, the program creates its own). For case B, the user specifies the die in terms of a die centroid file input without defining the net list. A net list is a listing of die pad connections giving pad number and/or die pad names to BGA connections in terms of alpha numeric coordinate. For case C, the user defines both the die centroid file and the net list. The assembly technology is set as flip chip or wirebond. Chip parameters are received as input, including such parameters as chip size, chip width, chip length, chip pitch, chip I/O, die pad size, die pad shape, and percent ground and voltage (defined above). Package parameters are defined, including such parameters as die up or cavity configuration, substrate size, module I/O count, number of outer rows, BGA pitch, number of vertex points defined for a line, number of rings, width and spacing of voltage and ground rings, size of via features (pad, dogbone, vias), increment of variable width, wire bond length, and wiring rules (minimum wire space and width).

Full matrix determination step 214, based on module size and pitch of BGA, calculates whether the number of columns is odd or even. Quadrant dividing slope is calculated, which is the slope of an imaginary line from the center of the package to the corner of the die, and an adjacent pair of these defines a quadrant. If the desired number of module I/O pads, or the number of outer rows, is provided by the user, the amount of depopulation is calculated. The Jedec alpha designation is entered for each row.

For case A, create die step 216 creates centroid data for flip chip or wire bond configuration. Table 17 sets forth the code 102 for step 216 generation of die. There are two cases of Generation of a Die: 1) Wirebond Single Row Peripheral, and 2) Flip Chip Area Array (which assumes square die).

For case B, create centroid data step 218, responsive to user provided centroid data, assigns each pad to a quadrant. This list is reordered, if needed, to a clockwise order while calculating the minimum chip pitch for output to graphical file 106 (minimum spacing between wire pads on a wirebound) and the curve (distance between edge of die and center line of outermost wire bond pad). Code 102 then calculates composition ratios.

For case C, create centroid step 220, assigns quadrants and calculates compositions (less work than case B).

TABLE 18

CENTROID DIE DATA GENERATION

```
/* Flip PADS CALCULATION...Case A */
if case ='a' then closestpads='Any Orthogonal Adjacent'
                              /* Print Ont in Graphical File
                              that keeps track of closest C4 to
                              C4 distance*/
Select                        /* This Select chooses between
                              Flip Chip Routine or Wirebond
                              Routine*/
when case='a' & tech='fc' then do  /* In the case of
                                   Flip Chip*/
Select                        /* This Select chooses between
                              setting the minimum C4 pitch to a
                              minimum or setting the number of
                              chip IO*/
when setchipcp='1' then do    /* If the chip
                              pitch is specified,
                              then do the
                              following*/
indent=edge+.5*dp             /* Figure out how far in the
                              centerline of the first pad
                              should be; edge (distance
                              defined by user representing
                              die edge to edge of die pad)
                              + half a die pad width*/
```

TABLE 18-continued

CENTROID DIE DATA GENERATION

```
dist=cz*1000-2*indent         /* Figure out the span,
                              in um when each
                              indentation is taken
                              out; cz=chip size in
                              mm*/
spaces=dist%cp                /* Take distance and divide
                              by chip pitch; cp. The %
                              sign in REXX takes the
                              integer part only*/
pads=spaces+1                 /* The total numbers of pads
                              is 1 more than the total
                              number of spaces*/
chipio=pads*pads              /* The total number pads is
                              the matrix of pad by pad*/
end
when setchipio='1' then do    /* This is the case
                              when you have a total
                              number of chip IO in
                              mind*/
do n=1 to 1000                /* Start stepping from a 1X1
                              array, 2x2 array, etc until
                              nXn is larger than the
                              requested IO*/
test=n*n-chipio
if test n>=0 then leave       /* when test is larger
                              than 0, then this
                              defines the matrix; it
                              will give chipio >=1
                              rowx1row greater*/
end
pads=n
indent=75+0.5*dp              /* Figure out how far in the
                              centerline of the first pad
                              should be; 75 um + half a die
                              pad width*/
dist=cz*1000-2*indent         /* Figure out the span,
                              in um when each
                              indentation is taken
                              out; cz=chip size in
                              mm*/
cp=dist/(pads-1)              /* Figure out the chip pitch
                              by taking the number of space
                              (pads-1) and divide it into
                              the distance available*/
end
otherwise; end
                              /*Calculate Actual Chip Pads that
                              are G/V or signals*/
chipgv=chiprat/100*chipio%1   /*Take the
                              Ground/Voltage Ratio;
                              chiprat, which is an
                              input parameter,
                              multiply by chipio and
                              take integer part...this
                              gives the number of chip
                              ground and voltage
                              chipio*/
chipsig=chipio-chipgv         /*Take the total Chipio,
                              subtract out the chip ground
                              and voltage and this gives
                              the number of signals*/
                              /* Need the padssig variable for the
                              lines per channel calculation*/
padssig=chipio%4              /*Padssig is the number of
                              signals per quadrant*/
if padssig//4>0 then padssig=padssig+1
                              /* Add one per side if there is 1,2, or
                              3 signal pads required*/
                              /*Polarity of C4 Matrix*/
                              /* Polarity of matrix means simply if
                              there is an odd number of columns/rows
                              it is odd; even if there is an even
                              number of rows*/
c4Polarity='odd'              /*Assume the polarity is
                              always odd*/
if pads//2=0 then c4Polarity='even'  /* Test to see if
                                     the number of pads
```

TABLE 18-continued

CENTROID DIE DATA GENERATION

```
                                   per side is evenly
                                   divisible by 2;
                                   remainder is set to
                                   even if it passes
                                   this test*/
                              /* Build the Dataset*/
                              /* Figure out where to start the pad
                              most extreme from the center of the die
                              (0,0) */
Select
when c4polarity='odd' then do
xstart=-pads%2*cp             /* Start in the third
                              quadrant and when odd, and it
                              is the integer part of a
                              division by two that gives
                              the number of pads on one
                              side of the y axis*/
ystart=xstart                 /* the y coordinate start
                              equals the x coordinate
                              start*/
end
otherwise                     /* This is the even case*/
xstart=-(pads/2-1)*cp-0.5*cp  /* There is a half
                                 pitch step from the
                                 y axis plus the
                                 number of spaces
                                 (pads/2-1)times the
                                 pitch*/
ystart=xstart                 /* the y coordinate start
                              equals the x coordinate
                              start*/
end
/* Create repeating column vector*/
b=0                           /* b is the pad number counter*/
do e=1 to pads                /* Start stepping from pad index
                              number 1 to the number of pads in
                              one column*/
do t=1 to pads                /* Start stepping from pad index
                              number 1 to the number of pads in
                              one row*/
b=b+1                         /* Set up the index number for the
                              die pad about to be defined in x
                              and y*/
xcoor=xstart+(e-1)*cp         /* x coordinate as a
                              function of starting
                              position plus the number
                              pad within the row*/
ycoor=ystart+(t-1)*cp         /* y coordinate as a
                              function of starting
                              position plus the number
                              pad within the column*/
padxy.b=xcoor||' '||ycoor     /* create a string that
                              has two components, the
                              x and y coordinate*/
end                           /*Do Loop*/
end                           /*Do Loop*/
/* Assign the Die Pad Coordinate to a north, west, south,
east side*/
divider=chipwidth/chiplength     /* This represents the
                                 slope of an imaginary
                                 line struck between the
                                 origin and the corner of
                                 the die*/
cnteast=0; cntnorth=0; cntwest=0; cntsouth=0;hit=0
                                 /*cnteast is the number
                                 of pads assigned to the
                                 eastern quadrant*/
n=0;nn=0;nnn=0;nnnn=0
do b=1 to chipio
parse value padxy.b with chipx chipy
chipxx=chipx                  /* need to call it something
                              else because next line
                              changes it just for one
                              calculation */
if chipx=0 then chipxx=.001      /* Die Pad on the Y
                                 axis is the Case of
                                 infiniteslope; then
```

TABLE 18-continued

CENTROID DIE DATA GENERATION

```
                              artificially set
                              just off y axis*/
chipslope=chipy/chipxx        /* Strike a line from
                              the center of the die to
                              the center of the pad*/
Select
when abs(chipslope)<divider&chipxx>0 then do
                              /* when the slope of
                              line is less than the
                              slope to the corner of
                              the die and the
                              xcoordinate is greater
                              than zero, then you know
                              you are on the east
                              side*/
side='East'; cnteastcnteast+1; end
when abs(chipslope)<divider&chipxx<0 then do
                           /* when the slope of line is less
                           than the slope to the corner of
                           the die and the xcoordinate is
                           less than zero, then position is
                           on the west side*/
side='West';cntwest=cntwest+1;end
when abs (chipslope)>divider&chipy>0 then do
                           /* when the slope of line is
                           greater than the slope to the
                           corner of the die and the y
                           coordinate is greater than zero,
                           then position is on the north
                           side */
side='North'; cntnorth=cntnorth+1; end
when abs (chipslope)>divider&chipy<0 then do
                           /* when the slope of line is
                           greater than the slope to the
                           corner of the die and the
                           ycoordinate is less than zero,
                           then position is on the south
                           side*/
side='South'; cntsouth=cntsouth+1;end
                           /* Next to represent those that
                           might be on the dividing line;
                           alternate by taking the odd/even
                           of a counter*/
when abs (chipslope)=divider&chipy>0&chipx>0 then do
                           /* On the Northeast dividing
                           line*/
n=n+1                      /*Index the counter*/
Select
when n//2=0 then do        /* when the counter is even,
                           assign to North side*/
side='North'
cntnorth=cntnorth+1
end
otherwise                  /* if the counter is not even,
                           then it must be odd, so assign to
                           East side*/
side='East'
cnteast=cnteast+1
end
end
when abs(chipslope=divider & chipy<0 & chipx<0 then
do
                           /* On the Southwest dividing
                           line*/
nn=nn+1
Select
when nn//2=0 then do       /* when the counter
                           is even, assign to
                           South side*/
side='South'
cntsouth=cntsouth+1
end
otherwise                  /* if the counter is not even,
                           then it must be odd, so assign to
                           West side*/
side='West'
cntwest=cntwest+1
```

TABLE 18-continued

CENTROID DIE DATA GENERATION

```
end
end
when abs(chipslope)=divider & chipy<0 & chipx>0
then do
                          /* On the Southeast dividing
                          line*/
nnn=nnn+1
Select
when nnn//2=0 then do     /* when the counter is
                          even, assign to East
                          side*/
side='East'
cnteast=cnteast+1
end
otherwise                 /* if the counter is not even,
                          then it must be odd, so assign to
                          South side*/
side='South'
cntsouth=cntsouth+1
end
end
when abs (chipsiope)=divider & chipy>0 & chipx<0 then
do
                          /* On the Northwest dividing
                          line* /
nnnn=nnnn+1
Select
when nnnn//2=0 then do    /* when the counter is even,
                          assign to West side*/
side='West'
cntwest=cntwest+1
end
otherwise                 /* if the counter is not even,
                          then it must be odd, so assign to
                          North side*/
side='North'
cntnorth=cntnorth+1
end
end
otherwise; end
padxy.b=padxy.b||' '||side   /* add on to the
                          centroid string that has
                          x and y coordinates with
                          the quadrant side*/
end
/*RANDOMIZE THE CHIP LABELS*/
/*This section now takes the % Ground/Voltage to
define the type of Chipio; either a signal, ground, or
voltage*/
chipgv=0                  /* Set the Ground and Voltage
                          counter to Zero*/
clip=100-chiprat          /* Find the percentage requested
                          that is signal io*/
Do b=1 to chipio          /* Start stepping through each
                          chipio*/
generate1=random(1,100)%1    /* Generate a random number
                             between 1 and 100; % gives
                             you the integer part only*/
Select
when generate1>clip then do  /* When the number is
                             above the signal pct; it
                             will be either a voltage
                             or ground*/
chipgv=chipgv+1              /* Add to the Ground and Voltage
                             Counter*/
generate2=random(1,2)        /* Now figure out whether it
                             will be a voltage or ground
                             by generating a number
                             between 1 and 2*/
Select
when generate2=1 then do     /* if is 1 then it is a
                             voltage*/
label='VDD'
end
otherwise
label='VSS'               /* if it is not 1 then it is
                          a ground*/
```

TABLE 18-continued

CENTROID DIE DATA GENERATION

```
end
end
otherwise                 /* when the number is below the
                          clip, assign the label as signal*/
label='Signal'
end
padxy.b=format(b,5,0)||' '||label||padxy.b
                          /* add to the front of the
                          centroid string the number of pad
                          plus the S,G,V label*/
end                       /*Do Loop End*/
end                       /* End Select*/
when case='a' & tech='wb' then do
                          /* Wire Bond CHIP PADS CALCULATION */
kerf=.5*dp+75             /* Calculate the kerf, the distance
                          between the die edge and the center of
                          the first pad. It is a half a die pad
                          plus the distance "edge" (defined by
                          user to represent die edge to edge of
                          die pad*/
indent=1.25*dp+kerf       /* Indent is going to be the
                          distance from the die pad to the
                          edge, in the direction parallel to
                          the succession of die pads; this
                          keeps the pads from overlapping
                          each other in the corners*/
dist=cz*1000-2*indent     /* This calculates the total
                          distance, from extreme die pad
                          centroid to extreme die pad
                          centroid*/
spaces=dist%cp            /* The integer part of the
                          distance divided by the chip
                          pitch; this gives you the number
                          of spaces available*/
pads=spaces+1             /* The total number of pads is
                          the number of spaces plus 1*/
chipio=4*pads             /* Total number of chipio is the
                          pads on one side multiplied by 4*/
/* CHIP I/O DATASET CREATION */
/* Repeating Vector*/
                          /* This will start die formation on the
                          east side of the die; most southern
                          point*/
xstart=.5*cz*1000-kerf    /* Figure the centroid of the
                          first die pad; it is half the
                          chip size (cz;in microns)
                          minus the kerf (calc.
                          above) */
ystart=.5*spaces*cp       /* This calculates the y position
                          where the first pad will start*/
do e=1 to pads            /* Create the repeating
                          coordinates */
a.e=-1*ystart+(e-1)*cp
end
/* COORDINATES FOR ALL PADS BUT IN 4 VECTOR SETS */
/* Create the centroid string for each side.
Contents will include: Pad #, X, Y, and side of
Die */
/*Start on the East side, then north, then west,
then South (CCW)*/
do n=1 to pads            /* Step thru pads on the east
                          side*/
id=n
eastx.n=format(xstart,5,0)   /* Create a matrix
                             called eastx, with an
                             index equal to the pad
                             number, the coordinate
                             will always equal
                             xstart*/
easty.n=format(a.n,5,0)      /* Create a matrix
                             called easty, with an
                             index equal to the pad
                             number, the coordinate
                             will be a function of
                             the pad number, ystart
                             and, the chip pitch*/.
```

TABLE 18-continued

CENTROID DIE DATA GENERATION

```
padxy.id=eastx.n||' '||easty.n||'East'
                              /* Create the matrix
                              padxy, whose value is a
                              string and index is pad
                              number that */
/* Do the similar thing for the other 3 sides of the
die, while giving each pad a successively higher pad
number*/
end
do n=1 to pads
id=1*pads+n
northx.n=-1*format(a.n,5,0)
northy.n=format(xstart,5,0)
padxy.id=northx.n||' '||northy.n||'North'
end
do n=1 to pads
id=2*pads+n
westx.n=-1*format(xstart,5,0)
westy.n=-1*format(a.n,5,0)
padxy.id=westx.n||' '||westy.n||'West'
end
do n=1 to pads
id=3*pads+n
southx.n=1*format(a.n,5,0)
southy.n=-1*format(xstart,5,0)
padxy.id=southx.n||' '||southy.n||'South'
end
/* RANDOMIZE THE CHIP LABELS*/
/* This is the same routine as was used in the area
array pad generation; commenting therefore is
similar/exact*/
chipgv=0
Do b=1 to chipio
  clip=100-chiprat
  generate1=random(1,100)%1
Select
  when generate1>clip then do
    chipgv=chipgv+1
    generate2=random (1,2)
  Select
    when generate2=1 then do
    label='VDD'
    end
    otherwise
    label='VSS'
    end
  end
  otherwise
  label='Signal'
  end
padxy.b=format(b,5,0)||' '||label||' 'padxy.b
end /*Do Loop End*/
end /* End When for Theoretical Die creation*/
```

Create BGA matrix step 222 for all cases A, B and C, starting with a full BGA matrix, creates a line of data with its x position, y position, slope from center of package, and quadrant. An alphanumeric matrix specifies the alpha/numeric location of the ball. Punch out depops data for balls that are not supposed to be there (from input). The resulting data set is separated into four separate quadrants. This step randomly assigns a type for each BGA pad in a quadrant to a signal, ground or voltage.

For case A and B, chip to BGA routing 224 separates chip centroid data into four matrices based on quadrant. The closest slope search routine starts on east side, takes the quadrant dividing slope (step 214) for this die pad position, determines the slope to all BGAs in the quadrant, and then finds the slope that is the closest to the quadrant dividing slope, and that slope defines the routing for this chip pad. Signal, but not ground and voltage, lines are thus routed. The selected BGA pad is then designated "used", and not available for subsequent pad selection. This process is repeated for die pads in order in this quadrant. The new maximum slope is that defined by the routing of the previous pad.

Step 226 calculates the runs, the power levels, wire bond fingers needed, and outputs to a file.

Step 228 uses Cramer's rule to solve for the intersection of all possible line combinations within the quadrant to see if the intersection falls within the space between a die pad and its connected BGA pad. If so, the count of crossings is incremented.

Step 230 generates summary file 112, and is more fully described in Tables 19–21.

TABLE 19

GOLD AND NICKEL CONSTANTS

```
/* GOLD AND NICKEL CONSTANTS */
gdens=19.3                    /* specific gravity of gold     */
ndens=8.89                    /* specific gravity of nickel   */
water=1/10000**3              /* grams per cubic micron       */
                              /* of water                     */
goldcost=goldcost*16/454      /* $ per gram of gold           */
nickelcost=nickelcost*16/454
                              /* $ per gram of nickel         */
numberrings=1                 /* number of bond rings in      */
                              /* addition to the ground       */
                              /* ring                         */
sqmicron2sqin=1/1000**2/25.4**2
                              /* conversion from sq microns   */
                              /* to sq inches                 */
```

TABLE 20

CALCULATION OF GOLD AREA

```
/* GOLD AREA FOR GROUND RING, VOLTAGE RING(S) AND      */
/* BOND FINGERS                                         */
/* unit of area used is in square microns              */
/* set width to voltage ring width established at the  */
/* beginning of the overall program                    */
width=voltagewidth
/* ring area accumulator                               */
ringarea=0
/* create a routine that sums up the ring areas        */
/* starting at the inner ground area and working out   */
/* j stands for the ring number; j=1 is the ground     */
/* ring, j=2 is the first voltage ring, j=3 is the     */
/* second voltage ring, etc.                           */
do j=1 to (numberrings +1)
  Select
  when j=1 then do
    width=groundwidth
  end
  otherwise
    width=voltagewidth
  end
  Select
  when j=2 then do
    voltageringpitch=groundwidth/2
      +ringspace+voltagewideth/2
  end
  otherwise
    voltageringpitch=voltagewidth+ringspace
  end
ring1length=chiplength*1000+diespace+(j-1) *voltageringpitch
ring2length=chipwidth*1000+diespace+(j-1) *voltageringpitch
ringarea=(ring1length+ring2length) *width*2+ringarea
end
/* end of summation of ring areas                      */
/* Calculate the total area of all the wire            */
/* bond fingers                                        */
Finger=chipsig*wbfingerlgth*wbfingerwdth
/* GOLD AREA FOR VIAS ON FULL GOLD FOR CAVITY          */
/* Via area is the addition of the lands (top and      */
/* bottom; which are disks) and the inner vertical     */
/* surface                                             */
finishedvia=viasize-2cuthk
```

TABLE 20-continued

CALCULATION OF GOLD AREA

```
/* Estimate via count for cavity, 16 vias added in          */
viacnc=.3*chipsig+4*4*numberrings
/* Calculate lands                                           */
vialandsc=2*3.1416*(viapadf**2-finishedvia**2)/4*viacnc
/* Inside vertical surface of PTH                            */
viainnerc=finishedvia*3.1416*lamthick*viacnc
/* Lands + Inner Surface                                     */
viagdc=vialandsc+viainnerc
/* FLOWER PAD                                                */
/* Estimate the diameter of the solid part of the            */
/* Flower Pad                                                */
diaf=.5*cz*1000
/* Add the Petals of the Flower plus the Circular            */
/* Area                                                      */
flower=6*cz*1000*petalwidth+3.1416*diaf*diaf/4
/* GOLD AREA OF VIAS FOR SELECTIVE DIE UP FLOWER             */
/* AND RING REGIONS                                          */
/* Estimate 2 vias per .25"× .25" area FOR DIAUP             */
/* FLOWER AREA                                               */
Viacndflower=flower/(6.35**2*1000**2)*2
/* Total number of drilled vias in a Diaup                   */
viacnd=viacndflower+chipsig
/* Total number of Backside(S2) Land Area                    */
viagdd=viacndflower*3.1416*(viapadb**2=finishedvia**2)/4
/* Estimate of ground bussing typically found on             */
/* S2 under the die                                          */
groundbussd=3.1416*diaf*diaf/4
/* Adjust flower area for vias and inner surface             */
flower=flower-3.1416*(viasize-2*cuthk)**2/4*viacondflower
+3.1416*(viasize=2*cuthk)*viacndflower
/* GOLD AREA BGA PADS                                        */
bgarea=)bgapadsize**2*3.1416/4)
+dogwidth*(bgaprocoat=bgadia)/2
/* Number of BGA pads on a cavity                            */
bgac=modio*bgarea
/* Number of BGA pads on a dia up                            */
bgad=bgac+thermal*bgarea
/* STIFFENER AREA                                            */
/* Stiffener is a piece of copper, the size of the           */
/* substrate, on cavity parts                                */
stiff=size*size*1000*1000
/* CAVITY WALL AREA                                          */
/* This is the area, on a cavity only, where the             */
/* ground ring wraps around the corner and downward          */
/* to the S2                                                 */
cav=((chipwidth*1000+diespace)*2
+(chiplength*1000+diespace))*(lamthick+2*cuthk)
/* CAVITY WIRING AREA FRONT AND BACK                         */
/* Figure out the area remaining that is available for       */
/* wiring and then apply a percentage of that area           */
/* that is wiring distance in one dimension                  */
/* encompassing the fingers, die, etc.                       */
innerside=(outeractual/1000-spacefnactual)
/* Area of this innerside                                    */
innerarea=innerside*innerside
/* Area of part, minus inner area, lands, BGA                */
wiringarea=stiff-innerarea-vialandsc-bgac
/* Estimate wiring covers 30% front 10% back                 */
wdensc=(0.3+0.1)*wiring area
/* CIRCUIT WIRING GOLD SUMMATION                             */
/* Add fingers and bonding rings; these are the              */
/* surface that are bonded to                                */
bondinggold=finger+ringarea
/* GOLD RUNNER                                               */
/* Gold runner is a small area used during the molding       */
/* process for die up                                        */
goldrun=goldrunwdth*goldrunhgt
/* TOTAL GOLD FOR CAVITY                                     */
/* Add the bonding surfaces, vias, wiring, cavity            */
/* wall, and BGA                                             */
togold=bondinggold-+-viagdc+bgac+cav
/* Multiply by gold thickness to get volume and              */
/* multiply by density                                       */
cost=goldcost*(tcgold+stiff)*goldthk*water*gdens
/* TOTAL GOLD FOR DIE UP SELECTIVE                           */
/* Add the bonding surfaces, flower pads, vias, BGA,         */
/* and ground buss                                           */
tdgold=bondinggold+flower+viagdd+bgad+groundbussd
/* Multiply by gold thickness to get volume and              */
/* multiply by density                                       */
dcst=goldcost*tdgold*goldthk*water*gdens
```

Table 21 is a pseudo code representation of choke factor determination. Choke factor is a measure of the amount of room left between the bond fingers and either the array of via lands (in a die up) or BGA pads (in a cavity). It is not a linear dimension but is unitless. It is unitless because the linear space is divided by the wiring pitch. This by definition is then the number of wiring pitches that can fit into the allotted space. Lower numbers are more choked, higher numbers are less choked. Negative numbers mean that there is no fanout room.

Dividing by the pitch gives a relative measure of the distance verses the 'fineness' of the wiring technology. A choke clip level is used to determine whether the module can be wired.

TABLE 21

CHOKE FACTOR DETERMINATION

```
/* DISTANCE LEFT FOR FINGERS AND FANOUT                      */
/* Units are microns                                         */
/* Calculate the distance from the center of the             */
/* substrate to the furthest voltage ring                    */
/* Width of ground ring + space between rings                */
/* + voltage ring width*number of rings                      */
/* CZ is the die in mm                                       */
inner=cz/2*1000+rings
/* The following routine determines the square that          */
/* inscribes either the BGA pads (in a cavity), or           */
/* the via land (in a dieup). This square is                 */
/* tangent to the                                            */
/* inside edge of either pad; and it is towards the          */
/* die. A matrix outer.k represents the size of              */
/* the spare for all possible depopulatons of BGA            */
/* balls. In reality, outer.k is half the length             */
/* of the square.                                            */
/* Depop.k is a matrix that existed higher up in the         */
/* overall program, and is an array whose value is           */
/* the number of positions in the depopulated BGA            */
/* matrix.                                                   */
/* The index, k, represents the number of outer rows         */
/* in the depopulated BGA matrix.                            */
/* Maxouterrow is calculated higher in the overall           */
/* program and is the largest number of outer                */
/* rows that a particular substrate size can                 */
/* possibly have.                                            */
do k=1 to maxouterrow
Select
when style='cavity' then do
/* This figures the distance from the center of the          */
/* module out to the linear edge of BGA precoat,             */
/* of the inner roll of balls.                               */
outer.k=(depop.k-1)/2*bgapitch__bgapitch-bgaprocoat/2
end
when style='dieup' then do
/* This figures the distance from the center of              */
/* the module out to the inner edge of the via               */
/* land on the inner rows of vias.                           */
outer.k=(depop.k-1)2*bgapitch+bgapitch+doglength-viapadf/2
end
otherwise; end
/* This is the calculation of the distance between the       */
/* BGA or Vias and rings; this is left for fingers           */
/* and fanout                                                */
spaceff.k=(outer.k-inner)/;1000
/* These three equations calculate the space left            */
/* after subtracting out that needed for the wire            */
```

TABLE 21-continued

CHOKE FACTOR DETERMINATION

```
/* bond wire and its pad and its procoat. The three         */
/* equations are similar, except for a variance of          */
/* bondwire length, nominal, high, and low.                 */
spacefn.k=(outer.k-((cz/2*1000)-indent)-wbnom
-wbfingerlgth/2-wbprocoat)/1000
spacefh.k=(outer.k-((cz/2*l000)-indent)-wbhi
wbfingerlgth/2-wbprocoat)/1000
spacefl.k=(outer.k-))cz/2*1000)-indent)-wblo
+wbfingerlgth/2-wbprocoat)/1000
/* Fanout length as a multiple of finest wiring pitch       */
/* This is the choke factor: fancha.k                       */
/* fancha.k i the nominal space for fanout, converted       */
/* to microns and divided by the wiring pitch               */
/* The wiring pitch is a constant and it is defined         */
/* high up in the code as wire width+wire space             */
/* The index, k, represents the number of outer rows        */
/* of BGA                                                   */
/* Choke Factor fancha.k                                    */
fancha. k=spacefn.k*1000/wirepitch
. .
end                /* End do loop                           */
```

Basically, the buildup technology (SLC) which is employed in providing the chip carrier layer count calculating method and system comprises a subroutine as follows:

This program keys in one the number of signals required to be fanned out per quadrant and calculates the number of sequential layers that would be required. Layer count is a critical cost intensive parameter since each layer added to the laminate has a compounding effect on yield. 1 layer=80%, 1 layers=80%80%=64%, etc.

This routine is part of the foregoing described larger program. The inputs to this subroutine are from this program. The recommended subroutine below indicates these inputs.

Extracted and contracted commented aspects are derived from this program that serves as a general flow chart:

Begin SLC Sizing Section cz was defined above; it is the size of the physical chip expressed in mm;

cp was defined above as minimum chip bump to chip bumppitch; it can be an input or calculated;

c4pad is an input; it is the size of the pad on the substrate that the chip bump sits on;

c4line this is an input; it is the minimum line width capable by mfg process;

c4space this is an input; it is the minimum space line to line capable by mfg process;

This defines a file named: Slc_customer

"Customer" is an input by the user, tags the file with the company name;

Figure out if the copper pad edge or procoat opening edge will define the wiring channel;

Calculate the maximum number of wiring pitches (spaces+width) that fit into the wiring channel;

Calculate the number of rows and corresponding number of chip pads on a quadrant basis;

Take a quadrant slide of the die along the diagonals Padsrow.o is a matrix that will define the number of pads that are left as you proceed towards the middle of the die, row by row, starting from edge and decremented by the two flanking diagonals. Pads A variable that has been calculated either by pitch/die size inputs or total chipio input.

This variable is the number of pads across one side of the chip. Calculates the number of wires per layer and stores in a matrix. Calculates the total number of pads rows until center is reached.

Calculate number of SLC Layers to handle required Chip Signal Count. This value is stored in a variable called max layers.

Output on a per layer basis and also summary.

The signal needs per quadrant, the layer number, the number of wires on this layer, the resulting un-wired of the total signals per quadrant, the number need divided by the wires per this layer . . . this is important on the last layer because it gives you an idea if you needed every bit of the last layer or you needed a very small pct. This either effects your confidence (the former), or (the latter) tells you might be able to go one layer less if you could just find a way to wire out just several.

Output a summary . . . See Output.

Pursuant to a more specific application, and wherein the particular layouts of the wiring lines or rats are illustrated in FIGS. 12A through 12D, the tabular representation of the foregoing is indicated in Table 22 referring to SLC output.

TABLE 22

SLC OUTPUT

| Signals Needed in Layer Per Quadrant | Layer Number | Number of Wires per Layer | Deficit | Needed/ WIres |
|---|---|---|---|---|
| 125 | 1 | 65 | 193 . | 3.97 |
| 193 | 2 | 62 | 131 . | 3.11 |
| 131 | . 3 | 59 | 72 | 2.22 |
| 72 | . 4 | 56 | 16 | 1.29 |
| 16 | . 5 | 53 | −37 | 0.30 |

This is a 5+5 SLC Structure (Does not Count FC1)
Chipio is 2238
Chip Pitch is 224.50
Chip Size is 18
Total Rows of the die is 22
The Die Matrix = 65×65
C4 Pad Diameter is 127 um
C4 Procoat Diameter is 195 um
Type of C4 Pad Site is nsmd
Number of Lines through C4 Channels is 0
Maximum Number of Layers given the total rows 22
Setting is Chipio, Chip Pitch 0 1

Pursuant to a further specific application, predicated on the code set forth below, the inputs needed are as follows:

1. c4 pad size
2. c4 procoat size
3. minimum c4 wiring space
4. minimum c4 wire width
5. chip C4 pitch
6. chip size
7. Chip kerf
8. % Chip IO that are ground or Voltage

```
* * * * * * * * * * * * * *Beginning of Code* * * * * * * * * * * * *
*
  /*Begin SLC Sizing Section */
  if c4pad>c4procoat then c4definintion='smd'
  if c4procoat>c4pad then c4definition='nsmd'
  Select
    when c4definition='smc' then do
    c4wirespace=cp−c4pad
    end
    otherwise
    c4wirespace=cp−c4procoat
    end
c4wiringpitches−c4wirespace/(c4line+c4space)-
```

-continued

```
c4space/(c4line4+c4space)
c41pc=c4wiringpitches%1
spread__rule=c4wirespace/(2*crlpc+1)/*Optimized Spread*/
spread__rule=format(spread__rule,3,0)
padsrow.1=pads
do 0=2 to 1000
     p+0-1
     padsrow.0=padsrow.p-3/*Note it is not minus 2; have to
account for quad neighbor*/if padsrow.0<0 then do
ttlrows=o-1
leave
     end
end
start=1; finish=start+c41pc
do layer=1 to 30
wires=0
do 0=start to finish
wires=padsrow.0+wires
if ttlrows=0 then leave
end
numberwires.layer=wires
start=finish+1; finish=startn+c41pc
if start>ttlrows then keave
end
maxlayers=layer
chipsigneed=chipsig/4
out='Signals Needed" Layer" Number of Wires" Deficit"
Needed/Wires in Layer'
out__file~lineout (OUT)
out='Per Quadrant" Number" per Layer'
out__file~lijeout (OUT)
Do layer=1 to maxlayers
if numberwires.layer<=0 then do
leave
end
delta=chipsigneed-numberwires.layer
pct=chipsigneed/numberwires.layer
pct=format(pct,2,2)
out=chipsigneed' layer' 'numberwires.layer' 'delta' 'pct
out__file~lineout (OUT)
chipsigneed=chipsigneed-numberwires.layer
if chipsigneed<=0 then leave
end
slccount=layer' 'pct'
***************End of Code***************
```

Furthermore, there is provided a tabulation of two outputs as follows:

Outputted in tow Places:

Under Chart.txt.File: which is a routine that looks at all the possible combinations of a Chip Carrier given a set of input structure.

| Case | Size | Rows | IO | Pitch | Pwr/Gnd | Size | Pitch | Sigs | Pwr/Gnd | Layers Used | Portion Layer LW/Space Full = 1 | C4LPC |
|---|---|---|---|---|---|---|---|---|---|---|---|---|
| 1 | 17 | 3 | 156 | 1000 | 40% | 5 | 250 | 94 | 77% | 1 + 1 | 0.64 | 42 |
| 2 | 17 | 4 | 192 | 1000 | 51% | 5 | 250 | 94 | 77% | 1 + 1 | 0.64 | 42 |
| 3 | 17 | 5 | 220 | 1000 | 57% | 5 | 250 | 94 | 77% | 1 + 1 | 0.64 | 42 |
| 4 | 17 | 6 | 240 | 1000 | 61% | 5 | 250 | 94 | 77% | 1 + 1 | 0.64 | 42 |

Second Output:

Under SLC.txt File: This focuses in on one particular point and gives more detail on how the signals are being

| Signals Needed Per Quadrant | Layer Number | Number of Wires per Layer | Deficit | Needed/ Wires in Layer |
|---|---|---|---|---|
| 112.25 | 1 | 45 | 67.25 | 2.49 |
| 67.25 | 2 | 33 | 3.25 | 2.04 |
| 34.25 | 3 | 21 | 13.25 | 1.63 |
| 13.25 | 4 | 9 | 4.25 | 1.47 |

This is a 5+5 SLC Structure (Does not Count FC1)
Chipio is 576
Chip Pitch is 250
Chip Size is 6
Total Rows of the die is 9
The Die Matrix=24×24
C4 Pad Diameter is 125 um
C4 Procoat Diameter is 110 um
Type of C4 Pad Site is smd
Number of Lines through C4 Channels is 1
Maximum Number of Layers given the total rows 5

The foregoing, by way of an example, is in connection with a 5+5 SLC structure, although other variations are readily implementable through intermediary of the present invention, which essentially is a further improvement on the parent patent application.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, JAVA, P1/1, FORTRAN or the like. And still further, each said step, or a file or object or the like implementing each said step, may be executed by special purpose hardware or a circuit module designed for that purpose.

While the invention has been particularly shown and described with respect to preferred embodiments thereof, it will be understood by those skilled in the art that the foregoing and other changes in form and details may be made therein without departing from the spirit and scope of the invention.

What is claimed is:

1. A method for electronically modeling and estimating characteristics of a multi-layer integrated circuit chip carrier having at least one chip thereon; comprising the steps of:

providing said chip carrier having at lease one redistribution layer thereon, said at least one redistribution layer including at least one conductive layer;

receiving specified input parameters; said parameters comprising ground rule and physical parameters selected from the group of parameters consisting of pad size, procoat opening size, minimum wiring width and spacing, chip contact pitch, chip size, border size and percent ground/voltage of chip I/Os; and through build up technology generating said representation responsive to said parameters;

selectively receiving or deriving a netlist of interconnections between said chip and said carrier;

responsive to said input parameters and netlist, generating a representation of an optimized estimated fanout of said interconnections; and graphically displaying said optimized estimated fanout together with a set of carrier parameters derived from said optimized estimated fanout.

2. A method as claimed in claim 1, comprising the further steps of:

receiving a plurality of said parameters;

responsive to said parameters, generating a graphical representation of a modular design together with text files rating module wireability;

said graphical representation and text files including chip pad position, attachment of each chip pad to its carrier pad, net cross-over, and selected input parameters; and said text files further including indicia rating wireability and cost sensitive characteristics of said modular design.

3. A method as claimed in claim 1, comprising the further steps of:

initializing a code module to model said chip carrier characteristics;

setting case variables;

determining full matrix parameters;

selectively creating a die, centroid string for die, or die and array centroid string;

creating an array matrix;

routing chip pads to array pads; and analyzing quadrants on said array matrix.

4. A method as claimed in claim 3, further including the step of assigning to each array pad a type, and said analyzing step further comprising the step of calculating runs of array pads of a same type.

5. A method as claimed in claim 3, said determining step further including the steps of:

defining array quadrants;

selectively calculating depopulation based upon user desired number of I/O pads or number of outer rows; and entering an alpha designation for each row.

6. A method as claimed in claim 3, said initializing step further including selectively designating output files, die pitch, number of desired die input/output pads, number of outer rows, and number of array input/output pads.

7. A method as claimed in claim 6, said setting step further including selectively designating a first case wherein said code module calculates a die and net list, a second case wherein a user specifies a die list and said code module calculates a net list, or a third case wherein said user specifies both a die list and a net list.

8. A method as claimed in claim 7, said setting step further including selectively designating flip chip or wirebond assembly technology.

9. A method as claimed in claim 3, further comprising the steps of:

first generating a crossing file;

second generating a summary file;

third generating a script file.

10. A method as claimed in claim 9, further comprising the steps of:

selectively outputting drill data;

selectively outputting array coordinate data; and selectively executing said script file.

11. A method as claimed in claim 9, said first generating step further comprising the steps of:

determining the intersection point for each possible pair of line combinations within a quadrant;

calculating a crossing count for each said quadrant, said crossing count being the number of said intersection points for lines within said each quadrant falling within the space between a die pad and a connected array pad for a pair of lines.

12. A method as claimed in claim 9, said second generating step further comprising the steps of:

determining choke factor;

determining complexity factor;

determining gold area factor; and storing said factors and input parameters to said summary file.

13. A method as claimed in claim 9, said third generating step further comprising the steps of:

defining substrate coordinates for top view and side view;

defining die coordinates for top view and side view; and drawing chamfer.

14. A method as claimed in claim 9, further comprising the step of:

displaying an annotated graphical drawing of said carrier showing point to point connections between die pads and array pads, alpha numeric pad designations, chip input parameters and substrate parameters.

15. A method as claimed in claim 7, said setting step further including designating one or more chip parameters from among the group of chip parameters including chip size, chip width, chip length, chip pitch, chip I/O, die pad size, die pad shape, and percent ground and voltage.

16. A method as claimed in claim 7, said setting step further including designating one or more package parameters from among the group of package parameters including configuration, carrier size, module I/O count, number of outer rows, ball grid array pitch, number of line vertex points, number of rings, width of voltage and ground rings, spacing of voltage and ground rings, size of via features, increment of variable width, wire bond length, SLC and wiring rules.

17. A method as claimed in claim 7, said creating step for said third case further including the steps of assigning pads to quadrants and calculating composition ratios.

18. A method as claimed in claim 7, said creating step further comprising the steps of:

building a matrix of array pad data, including:

assigning array input/output pads to quadrants;

determining for each said array pad its coordinates and slope;

specifying an alpha/numeric location of each said array pad; and depopulating from said matrix data for array pads in a punch out area.

19. A method as claimed in claim 18, further comprising the step of randomly assigning a type for each said array pad, said type being selected from the group of types including signal, ground, and voltage.

20. A method as claimed in claim 7, said routing step further comprising the steps of:

determining quadrant dividing slopes;

separating centroid data into four matrices based on quadrant;

executing a closest slope search routine, including:

determining the slope of a first signal die pad in a first quadrant;

finding the slope to remaining array pads within said first quadrant;

selecting from said remaining array pads the array pad having a slope most closely matching the quadrant dividing slope for said first quadrant;

defining the routing for said first signal die pad to the selected array pad;

removing said selected array pad from the set of said remaining array pads and setting said quadrant dividing slope to the slope of said selected array pad;

repeating said executing step for each said signal die pad in each said quadrant.

21. A method as claimed in claim 8, said setting step for said first case further including the steps of creating said centroid data selectively for said flip chip or wire bond configuration as a wirebond single row peripheral or flip chip area array configuration.

22. A method as claimed in claim 8, said creating step for said second case further comprising the steps of:

responsive to user provided centroid data, assigning each pad to a quadrant;

reordering the order of said pads as may be required while, for wirebound, determining minimum chip pitch and curve.

23. A method as claimed in claim 22, said creating step further comprising the step of calculating composition ratios.

24. A program storage device readable by a machine, tangibly embodying a program of instruction executable by a machine to perform method steps for modeling and estimating characteristics of a multilayer integrated circuit chip carrier preliminary to preparing a detailed design, said method steps comprising:

providing said chip carrier having at least one redistribution layer thereon, said at least one redistribution layer including at least one conductive layer;

receiving specified input parameters; and responsive to said input parameters, generating a representation of an optimized distribution of said at least one conductive layer.

25. An article of manufacture comprising a chip carrier and a die:

a computer useable medium having computer readable program code means embodied therein for modeling an estimating characteristics of a multilayer integrated chip carrier preliminary to preparing a detailed design, the computer readable program means in said article of manufacture comprising:

computer readable program code means for causing a computer to effect receiving input parameters include die size and carrier size;

computer readable program code means for causing a computer to effect selectively receiving or deriving a netlist of interconnections between said die and said carrier;

computer readable program code means for causing a computer to effect responsive to said input parameters and netlist, generating a representation of an optimized estimated fanout of said interconnections; and computer readable program code means for causing a computer to effect graphically displaying said optimized estimated fanout together with a set of carrier parameters derived from said optimized estimated fanout.

26. A computer program product or computer program element for modeling and estimating characteristics of a multilayer chip carrier preliminary to preparing a detailed design according to the steps of:

providing said chip carrier having at least one redistribution layer thereon, said at least one redistribution layer including at least one conductive layer;

receiving specified input parameters; and responsive to said input parameters, generating a representation of an optimized distribution of said at least one conductive layer.

27. A computer program product or computer program element as claimed in claim 26, wherein based upon said input parameters, a program determines the number of signal distribution layers required to access module I/O bumps (BGAs).

28. A system for electronically modeling and estimating characteristics of a multi-layer integrated circuit chip carrier having at least one chip thereon; comprising:

means for providing said chip carrier having at least one redistribution layer thereon, said at least one redistribution layer including at least one conductive layer;

means for receiving specified input parameters said parameters comprising ground rule and physical parameters selected from the group of parameters consisting of pad size, procoat opening size, minimum wiring width and spacing, chip contact pitch, chip size, border size; percent ground/voltage of chip I/Os, and SLC; and generating said representation responsive to said parameters;

means for selectively receiving or deriving a netlist of interconnections between said chip and said carrier;

means for generating a representation of an optimized estimated fanout of said interconnections responsive to said input parameters and netlist; and means for graphically displaying said optimized estimated fanout together with a set of carrier parameters derived from said optimized estimated fanout.

29. A system as claimed in claim 28, comprising:

means for receiving a plurality of said parameters;

means for generating a graphical representation of a modular design together with text files rating module wireability responsive to said plurality of parameters;

said graphical representation and text files generating means including chip pad position, attachment of each chip pad to its carrier pad, net cross-over, and selected input parameters; and said text files further including indicia rating wireability and cost sensitive characteristics of said modular design.

* * * * *